(12) United States Patent
Freeman et al.

(10) Patent No.: US 9,816,422 B2
(45) Date of Patent: Nov. 14, 2017

(54) FLOWHOOD AND EMISSIONS CLEANING MODULE

(71) Applicant: Perkins Engines Company Limited, Peterborough, Cambridgeshire (GB)

(72) Inventors: Susannah Freeman, Peterborough (GB); Anton Zimmermann, Quorn (GB); Andrew Keen, Peterborough (GB); David Heaton, Peterborough (GB); Christopher Petto, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 96 days.

(21) Appl. No.: 14/783,362

(22) PCT Filed: Apr. 11, 2014

(86) PCT No.: PCT/GB2014/051143
§ 371 (c)(1),
(2) Date: Oct. 8, 2015

(87) PCT Pub. No.: WO2014/167353
PCT Pub. Date: Oct. 16, 2014

(65) Prior Publication Data
US 2016/0069239 A1    Mar. 10, 2016

(30) Foreign Application Priority Data

Apr. 11, 2013  (GB) .................................. 1306624.6
Nov. 8, 2013   (GB) .................................. 1319752.0
Nov. 8, 2013   (GB) .................................. 1319755.3

(51) Int. Cl.
*B01D 50/00*      (2006.01)
*F01N 3/28*       (2006.01)
(Continued)

(52) U.S. Cl.
CPC ......... *F01N 3/2892* (2013.01); *F01N 3/2066* (2013.01); *F01N 13/0097* (2014.06);
(Continued)

(58) Field of Classification Search
CPC ............... F01N 13/1888; F01N 3/2892; F01N 2240/20; F01N 2610/02
(Continued)

(56) References Cited

U.S. PATENT DOCUMENTS

2009/0158721 A1    6/2009  Wieland et al.
2009/0313979 A1*  12/2009  Kowada ............. B01D 53/9431
                                                       60/297
(Continued)

FOREIGN PATENT DOCUMENTS

CN      101874152       10/2010
EP      2128398 A1      12/2009
(Continued)

OTHER PUBLICATIONS

European Patent Office, International Search Report in International Patent Application No. PCT/GB2014/051143, dated Jul. 3, 2014, 2 pp.
(Continued)

*Primary Examiner* — Tom P Duong

(57) ABSTRACT

A flowhood is provided to which an upstream conduit and a downstream conduit of an emissions cleaning module can be connected includes a first section and a second section. The second section includes a first aperture for connection to the upstream conduit and a second aperture for connection to the downstream conduit. The first and second apertures may face substantially in the same direction to permit a compact arrangement. A body of the first section may be shaped to
(Continued)

channel gas flow from the first aperture to the second aperture. An emissions cleaning module including such a flowhood is also described.

19 Claims, 36 Drawing Sheets

(51) Int. Cl.
 *F01N 3/20* (2006.01)
 *F01N 13/18* (2010.01)
 *F01N 13/00* (2010.01)
(52) U.S. Cl.
 CPC ...... *F01N 13/1888* (2013.01); *F01N 2240/20* (2013.01); *F01N 2470/08* (2013.01); *F01N 2610/02* (2013.01); *Y02T 10/24* (2013.01)
(58) Field of Classification Search
 USPC .......................................... 422/168
 See application file for complete search history.

(56) References Cited

U.S. PATENT DOCUMENTS

2010/0146950 A1* 6/2010 Hayashi ............. B01D 53/9431
 60/301
2010/0242451 A1 9/2010 Werni et al.

FOREIGN PATENT DOCUMENTS

| EP | 2295756 A1 | 3/2011 |
| EP | 2568140 A1 | 3/2013 |
| FR | 2882091 A1 | 6/2006 |
| JP | 2005-155404 A | 6/2005 |
| WO | WO 2012/110720 A1 | 8/2012 |

OTHER PUBLICATIONS

United Kingdom Intellectual Property Office, Search Report in United Kingdom Patent Application No. GB1306624.6, dated Oct. 11, 2013, 2 pp.

* cited by examiner

FLOWHOOD AND EMISSIONS CLEANING MODULE

CROSS-REFERENCE TO RELATED APPLICATIONS

This application is a national phase application of International Patent Application No. PCT/GB2014/051143, filed Apr. 11, 2014, which claims priority to United Kingdom Patent Application No. GB1306624.6, filed Apr. 11, 2013, United Kingdom Patent Application No. GB1319752.0, filed Nov. 8, 2013, and United Kingdom Patent Application No. GB1319755.3 filed Nov. 8, 2013, each of which is incorporated by reference herein in its entirety for all purposes.

TECHNICAL FIELD

This disclosure relates to an apparatus for cleaning exhaust gases emitted during the operation of an engine such as an internal combustion engine.

BACKGROUND

Engines, for example internal combustion (IC) engines burning gasoline, diesel or biofuel, output various substances as part of their exhaust gases which must be treated to meet current and future emissions legislation. Most commonly those substances comprise hydrocarbons (HC), carbon monoxides (CO), mono-nitrogen oxides ($NO_x$) and particulate matter, such as carbon (C), a constituent of soot. Some of those substances may be reduced by careful control of the operating conditions of the engine, but usually it is necessary to provide an emissions cleaning module downstream of the engine to treat at least some of those substances entrained in the exhaust gas. Various apparatus for reducing and/or eliminating constituents in emissions are known. For example, it is known to provide an oxidation device, such as a diesel oxidation catalyst (DOC) module, to reduce or to eliminate hydrocarbons (HC) and/or carbon monoxide (CO). Oxidation devices generally include a catalyst to convert those substances into carbon dioxide and water.

In addition, it is known to reduce or eliminate mono-nitrogen oxides ($NO_x$) in diesel combustion emissions by conversion to diatomic nitrogen ($N_2$) and water ($H_2O$) by catalytic reaction with reductant chemicals such as ammonia ($NH_3$) entrained in the exhaust gas. Generally ammonia is not present in exhaust gas and must therefore be introduced upstream of a catalyst, typically by injecting a urea solution into the exhaust gas which decomposes into ammonia at sufficiently high temperatures.

By these methods, engine emissions can be cleaned, meaning that a proportion of the substances which would otherwise be released to atmosphere are instead converted to carbon dioxide ($CO_2$), nitrogen ($N_2$) and water ($H_2O$).

Against this background there is provided a flowhood and an emissions cleaning module.

SUMMARY OF THE DISCLOSURE

The present disclosure provides a flowhood for an emissions cleaning module having an upstream conduit and a downstream conduit, the flowhood comprising:
a first section and a second section, wherein the second section comprises a first aperture for connection to the upstream conduit and a second aperture for connection to the downstream conduit.

The present disclosure further provides an emissions cleaning module comprising an upstream conduit, a downstream conduit and a flowhood as described above.

BRIEF DESCRIPTION OF THE DRAWINGS

Embodiments of the present disclosure will now be described, by way of example only, with reference to the accompanying drawings in which.

DETAILED DESCRIPTION

Figure 1:
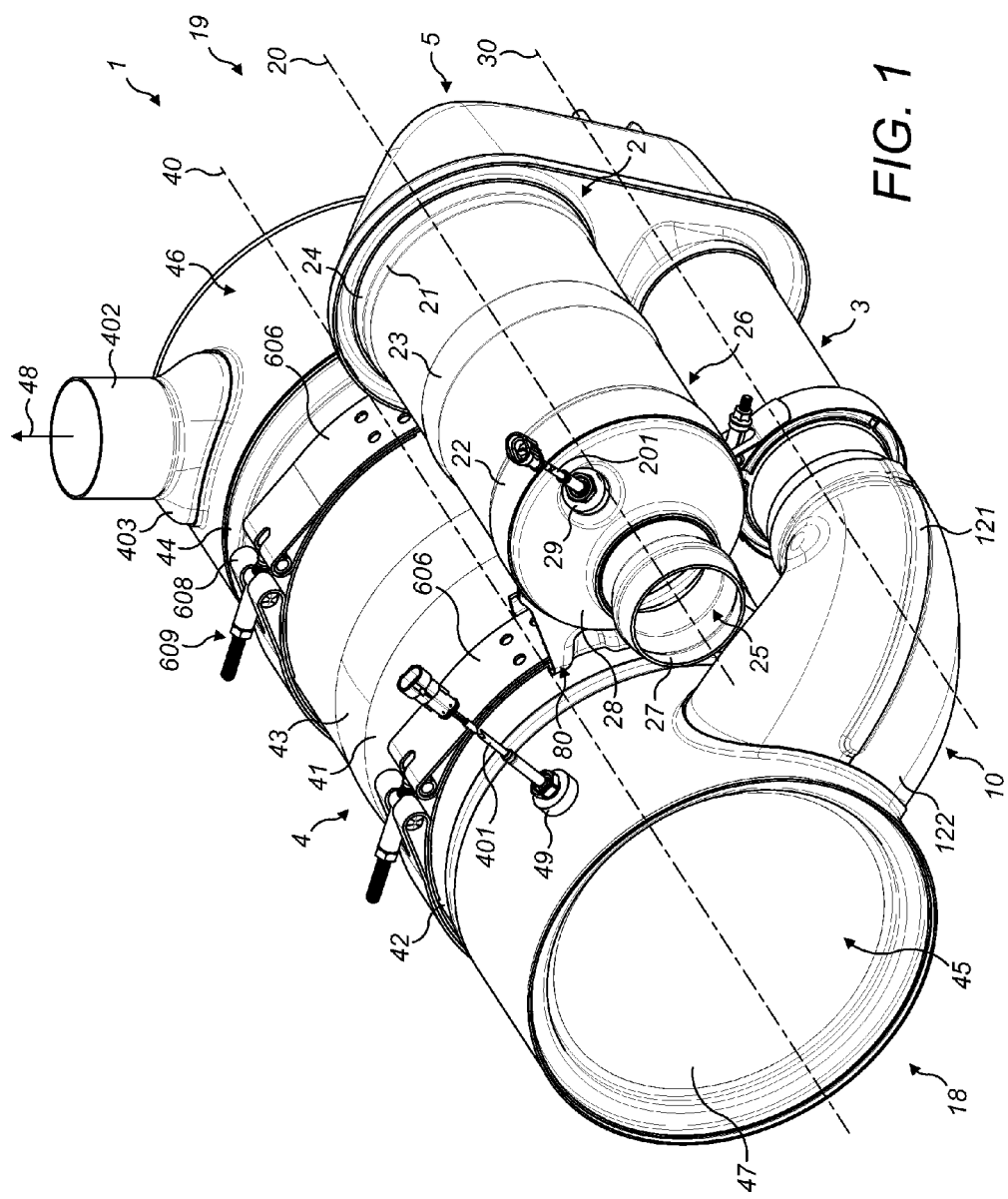
FIG. 1 shows a perspective view of a first embodiment of emissions cleaning module without heat shields mounted thereto.
Figure 2:
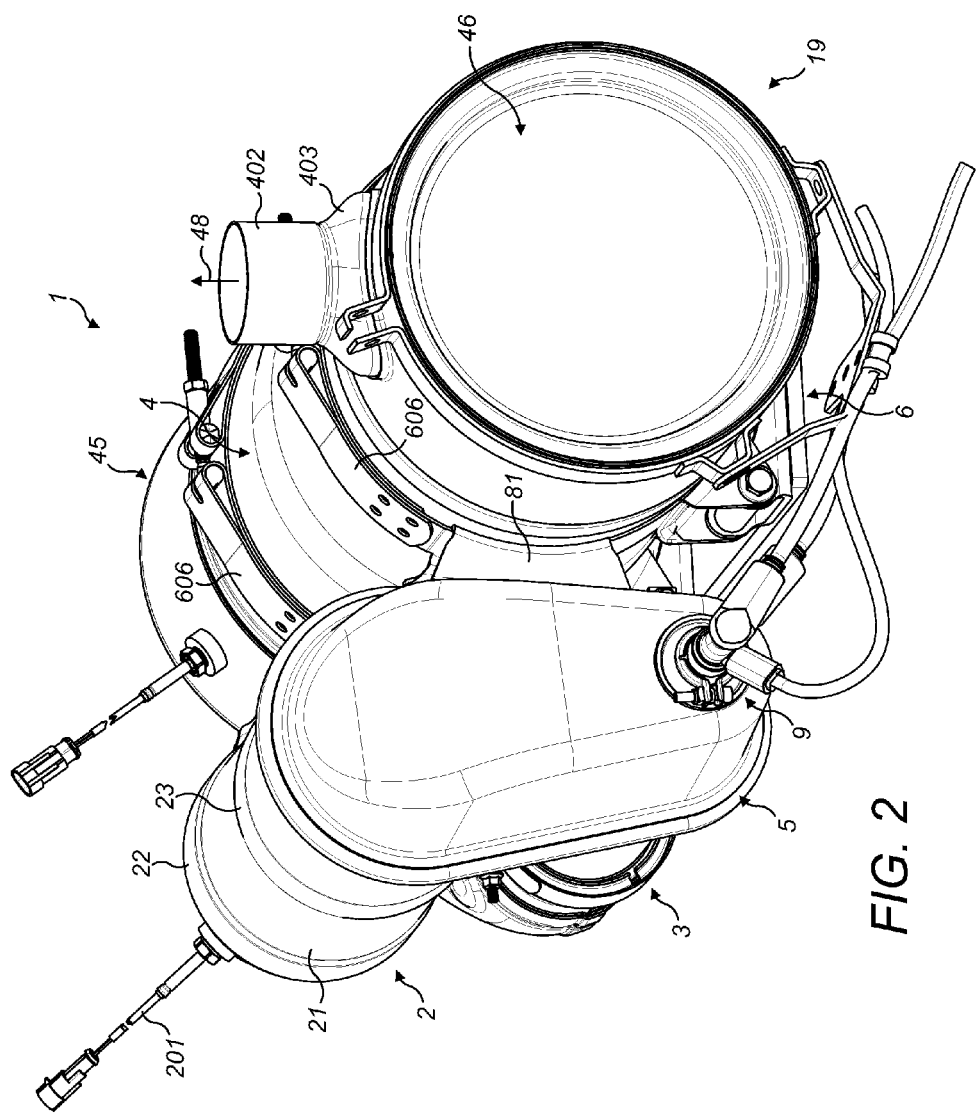
FIG. 2 shows a perspective view of the emissions cleaning module of FIG. 1 from another angle.

In the following description various embodiments of emissions cleaning module 1 will be described and components of said emissions cleaning modules will be discussed. It should be understood that, unless explicitly stated, features and components of one embodiment may be combined with features and components of another embodiment. For example, in the following description, a first mounting mechanism 6 and a second mounting mechanism 110 will be described for mounting the emissions cleaning module 1 to an external support or mount, which may be for example a chassis or an engine component. It should be understood that either the first mounting mechanism 6 or the second mounting mechanism 110 may be used with any of the described configurations of emissions cleaning module 1.

In addition, certain features and components may be present in more than one embodiment of the emissions cleaning module 1. In the following description, those features and components may be described fully with reference to only a single embodiment but, unless explicitly stated, may fully form part of the other embodiments described. Further, certain components may be described, for reasons of clarity, with reference to drawings relating to more than one embodiment.

The emissions cleaning module 1 may comprise a plurality of exhaust gas treatment devices. In the following description reference will be made to the emissions cleaning module comprising one or more of a diesel oxidation catalyst (DOC) module, a selective catalytic reduction (SCR) module and an AMOX module. It will be appreciated that the emissions cleaning module 1 may also contain any other exhaust gas treatment devices as known in the art.

A DOC module may comprise one or more catalysts, such as palladium or platinum, which may be in the form of catalyst bricks. These materials serve as catalysts to cause the oxidation of hydrocarbons ([HC]) and carbon monoxide (CO) present in the exhaust gas in order to produce carbon dioxide ($CO_2$) and water ($H_2O$) and the oxidization of nitrogen monoxide (NO) into nitrogen dioxide ($NO_2$). The catalysts may be distributed in a manner so as to maximise the surface area of catalyst material in order to increase effectiveness of the catalyst in catalysing reactions. The catalyst bricks are inherently variable in diameter, up to +/−2.5 mm.

An SCR module may comprise one or more catalysts through which a mixture of exhaust gas and urea/ammonia may flow. As the mixture passes over the surfaces of the catalyst a reaction may occur which converts the ammonia and NOx to diatomic nitrogen ($N_2$) and water ($H_2O$).

An AMOX module may comprise an oxidation catalyst which may cause residual ammonia present in the exhaust gas to react to produce nitrogen ($N_2$) and water ($H_2O$).

FIGS. 1 to 19 show a first embodiment of an emissions cleaning module 1 according to the present disclosure.

The emissions cleaning module 1 comprises a first conduit 2, a second conduit 4, and a third conduit 3. The first conduit 2 may be elongate and have a longitudinal axis 20 defining its axis of elongation. The second conduit 4 may be elongate and have a longitudinal axis 40 defining its axis of elongation. The third conduit 3 may be elongate and have a longitudinal axis 30 defining its axis of elongation. The first conduit 2, second conduit 4 and third conduit 3 may be arranged substantially parallel to one another such that the longitudinal axes 20, 40, 30 are parallel to one another. The emissions cleaning module 1 may have a first end 18 and a second end 19.

The first conduit 2 may comprise a cylindrical body 21. An inlet connector 26 may be mounted to an end of the cylindrical body 21 nearest the first end 18 of the emissions cleaning module 1. The inlet connector 26 may comprise a conical section 28 that is mounted to the cylindrical body 21 and which may taper to join with a mounting pipe 27 which may define an inlet 25 of the first conduit 2. In use, a conduit carrying exhaust gas may be connected to the mounting pipe 27.

An end of the cylindrical body 21 nearest the second end 19 of the emissions cleaning module 1 may define an outlet 205 of the first conduit 2.

The cylindrical body 21 may comprise a first ridge 22, a second ridge 23 and a third ridge 24 which may lie proud of a remainder of the cylindrical body 21 and which may be spaced along the longitudinal axis 20. The first ridge 22 may be located nearest the first end 18. The third ridge 24 may be located nearest the second end 19. The second ridge 23 may be located in between the first ridge 22 and the third ridge 24.

Figure 11:
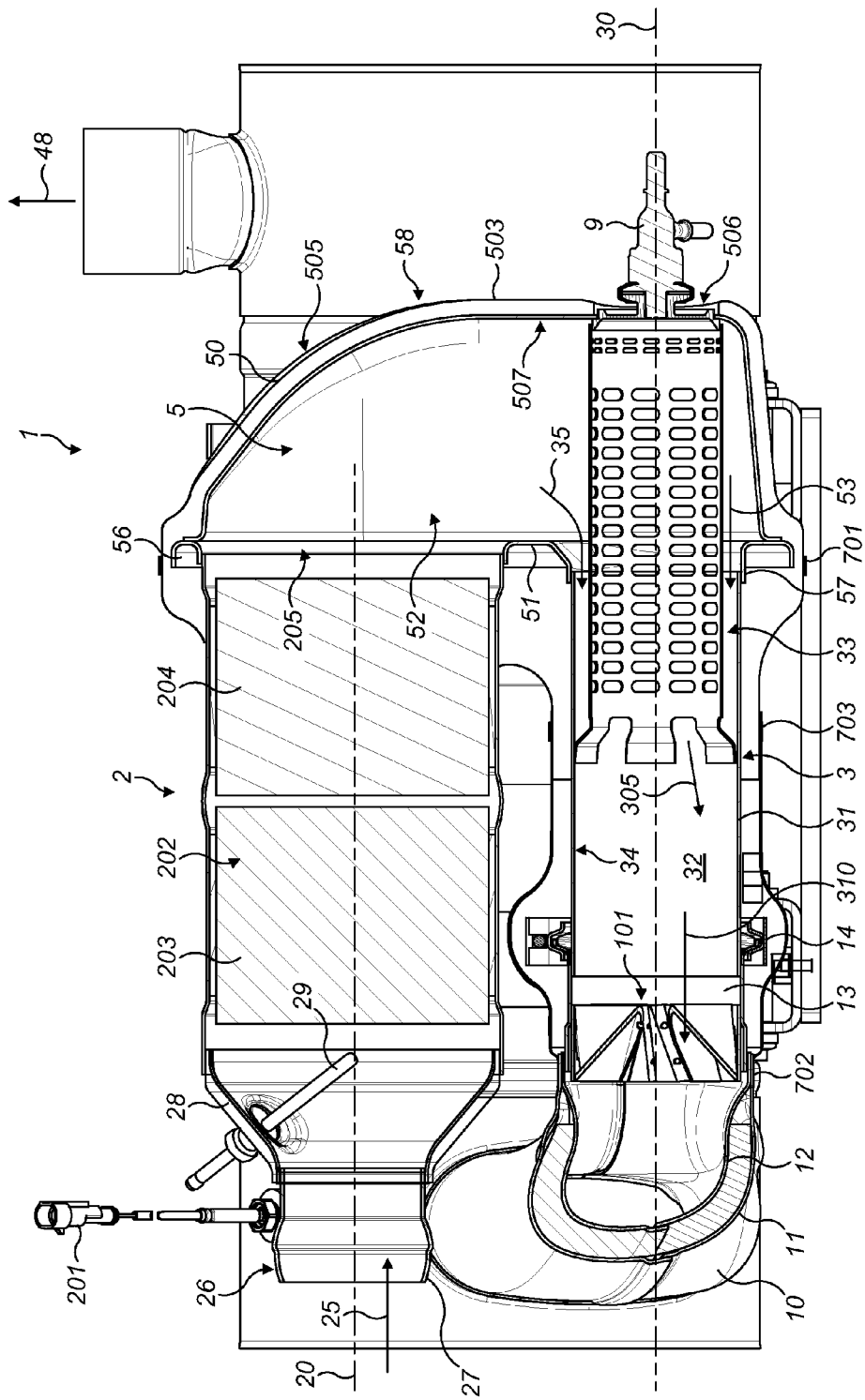
FIG. 11 shows a part cross-sectional view of the emissions cleaning module of FIG. 9.

A temperature sensor 29 may be mounted in the first conduit 2. As shown in FIGS. 1 and 11, the temperature sensor 29 may be mounted in the conical section 28 of the inlet connector 26. The temperature sensor 29 may extend into an interior of the first conduit 2 such that a distal end of the temperature sensor 29 may lie on or in proximity to the longitudinal axis 20 of the first conduit 2. The temperature sensor 29 may be connected to an external unit (not shown) by means of a temperature sensor lead 201.

As shown in FIG. 11, the first conduit 2 may house a diesel oxidation catalyst (DOC) module 202. The DOC module 202 may comprise one or more DOC elements. In the example illustrated a first DOC element 203 and a second DOC element 204 are provided. The first DOC element 203 and the second DOC element 204 may be identical to each other. Alternatively, the first DOC element 203 and the second DOC element 204 may be configured differently. For example a different catalytic treatment may be applied to each element.

The outlet 205 of the first conduit 2 may be fluidly connected to the third conduit 3 by a flowhood 5. The flowhood 5 is a component used for directing flow of an exhaust gas, preferably from one conduit to another conduit. The flowhood 5 may be formed from one or more components which are separate from the first conduit 2 and the third conduit 3. Thus, the flowhood 5 may be connectable to the first conduit 2 and the third conduit 3 during assembly of the emissions cleaning module 1 to provide a connection which spans between the first conduit 2 which is upstream of the flowhood 5 and the third conduit 3 which is downstream of the flowhood 5. Thus, the flow of exhaust gas in use may flow from the first conduit 2 through the flowhood 5 and into the third conduit 3. At the same time the flowhood 5 may invert the direction of the flow of an exhaust gas passing therethrough such that the direction of the flow of the exhaust gas in the first conduit 2 may be opposite that in the third conduit 3.

Figure 12:
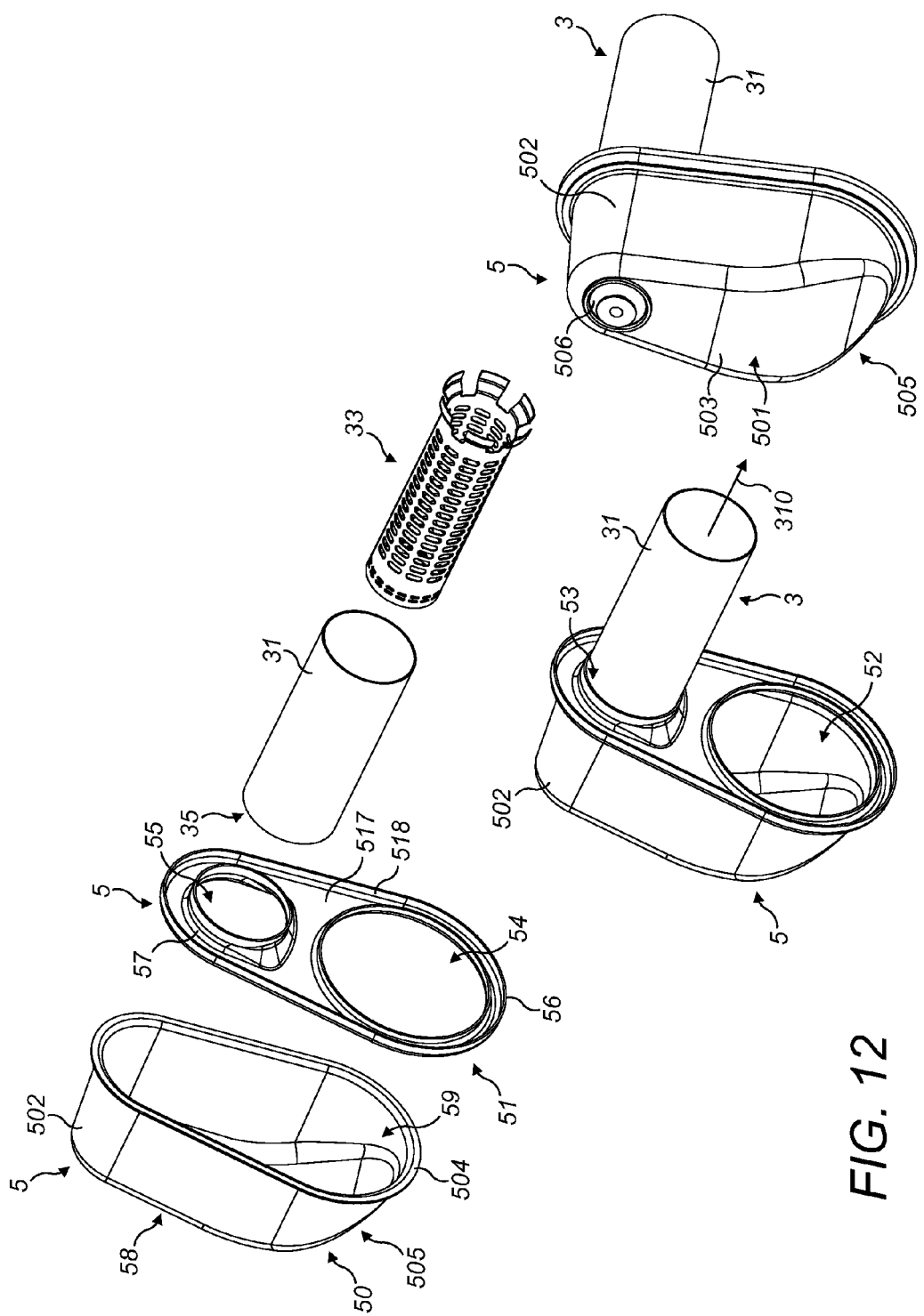
FIG. 12 shows an exploded perspective view, and an assembly view, of a flow hood of the emissions cleaning module of FIG. 1.

As shown in FIG. 12, the flowhood 5 may comprise a first section 50 and a second section 51 which may be joined together by, for example, welding.

The first section 50 may have a body 58 which may be concave having a closed back 501 and an open mouth 59. The closed back 501 may be formed from a rear wall 503 and a side wall 502 which may extend from the rear wall 503 and may terminate at the open mouth 59 in a flange 504 which may extend outwardly. The open mouth 59 may be defined by a rim lying in a single plane, for example, with the flange 504 defining the rim. The closed back 501 of the flowhood 5 may comprise a rounded portion 505 at one end. The body 58 may be tapered in one or more dimensions such that a length and/or breadth of the first section 50 may reduce in the direction from the open mouth 59 towards the closed back 501 and may also taper from one end of the flowhood 5 to the other. Such tapering may be accomplished by shaping and/or angling of the side wall 502. As shown in FIG. 12, the tapering at the rounded portion 505 may be more substantially than at an opposite end of the flowhood 5.

The second section 51 may comprise a body 517 which may be in the form of a plate having a flange 518 around its outer edge. A first aperture 54 and a second aperture 55 may be provided in the body 517. The first aperture 54 may be larger than the second aperture 55. The first aperture 54 may be surrounded by a first flange 56. The second aperture 55 may be surrounded by a second flange 57.

As shown in FIG. 12, the second section 51 may be mounted to the first section 50 and fastened by, for example, welding. The first aperture 54 may define an inlet 52 to the flowhood 5 at an upstream end of the flowhood 5. The second aperture 55 may define an outlet 53 from the flowhood 5 at a downstream end of the flowhood 5. The inlet 52 and the outlet 53 may face in the same direction.

The closed back 501 may be provided with an aperture 506 for mounting an injector module (to be described below). It should be noted that once the injector module is mounted in the aperture 506 the closed back 501 may form a fluid barrier such that exhaust gases entering through the inlet 52 may be channeled to the outlet 53.

The third conduit 3 may comprise a cylindrical body 31. As most clearly shown in FIG. 11, the cylindrical body 31 defines a mixing chamber 32 that may be provided with an inlet 35 towards the second end 19 of the emissions cleaning module 1 and an outlet 310 positioned towards the first end 18 of the emissions cleaning module 1. The cylindrical body 31 may be mounted in the second aperture 55 of the flowhood 5. The cylindrical body 31 may be welded to the body 517 of the flowhood 5 around the second aperture 55. A mixing element 33 may be provided to extend within a portion of the cylindrical body 31.

The mixing element 33 may project upstream of the inlet 35 so as to extend within the flowhood 5.

Figure 13:
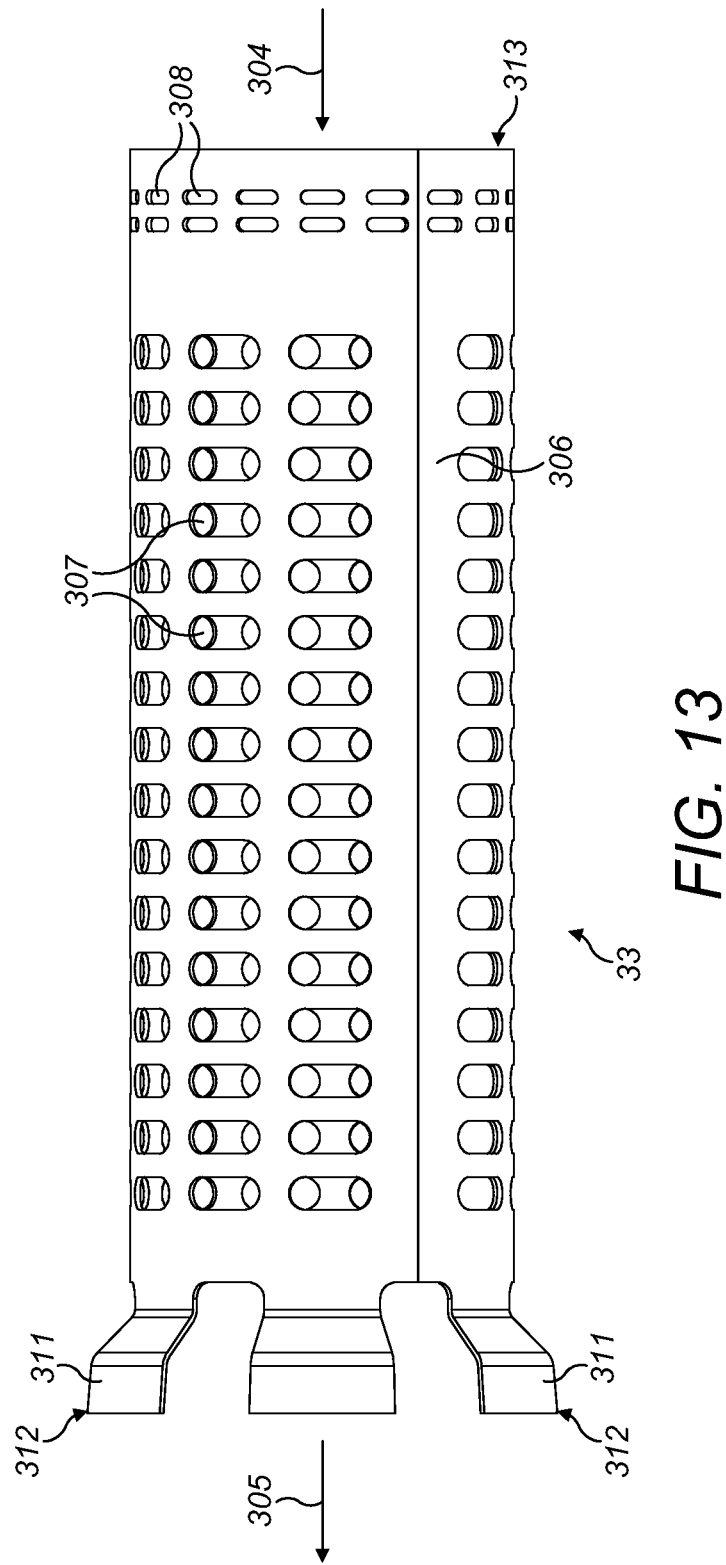
FIG. 13 shows a side view of a mixing element of the emissions cleaning module of FIG. 1.
Figure 14:
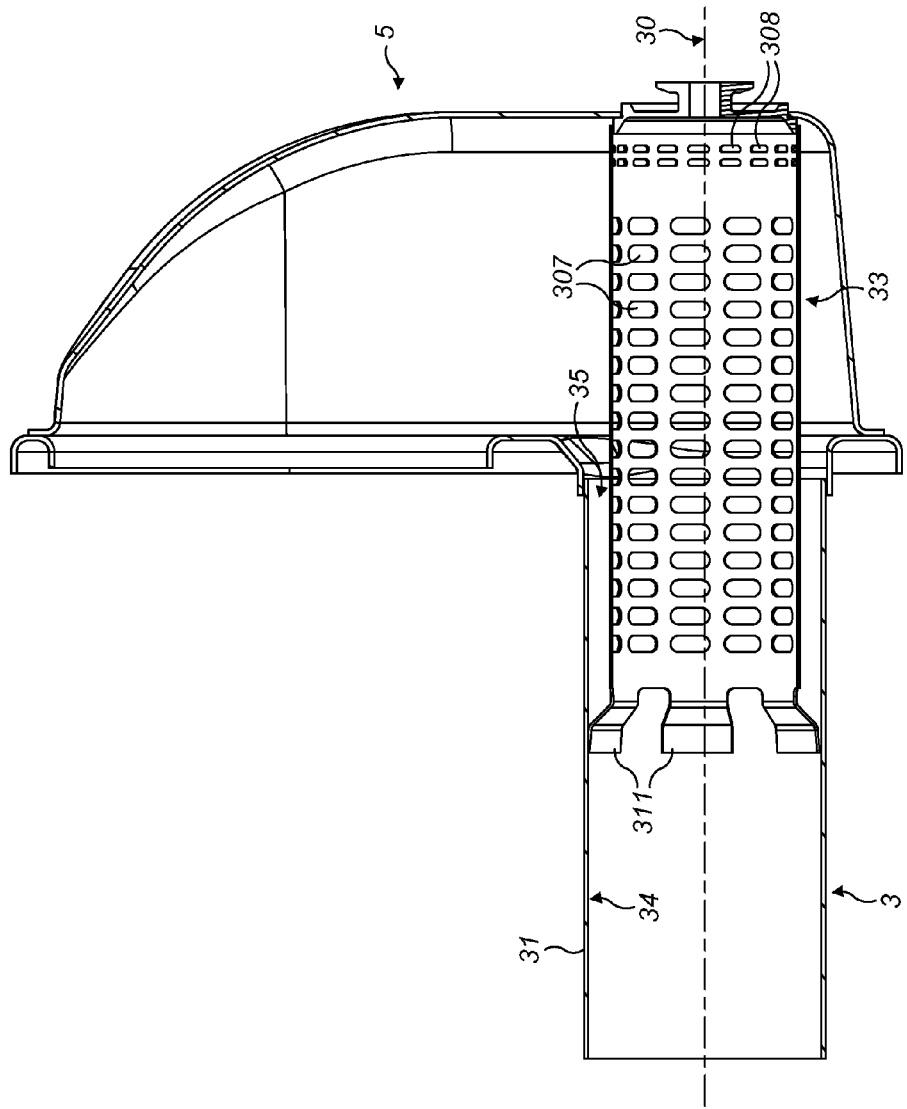
FIG. 14 shows a cross-sectional view of a portion of the emissions cleaning module of FIG. 1.
Figure 15:
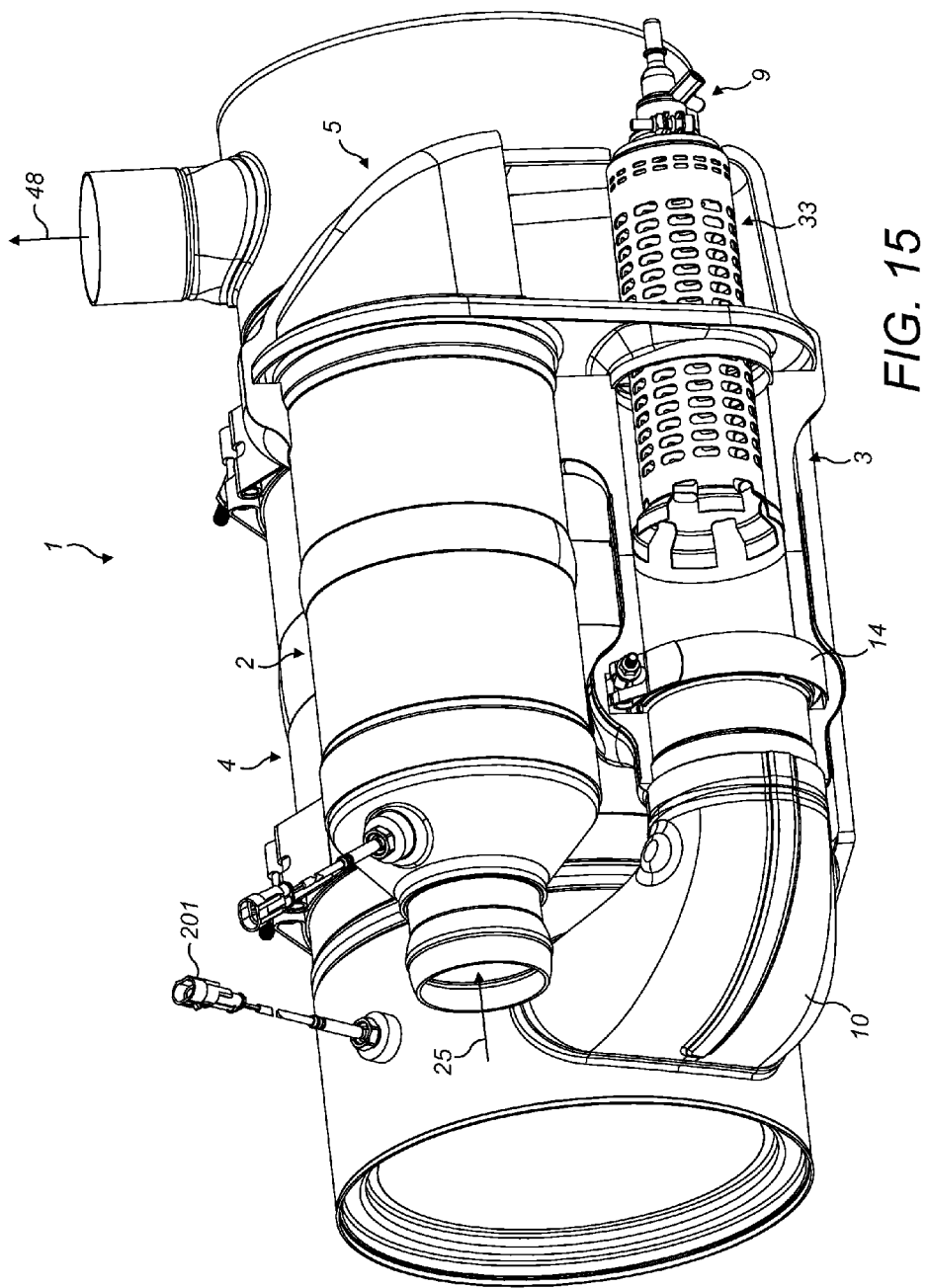
FIG. 15 shows a perspective view of the emissions cleaning module of FIG. 1 with certain parts omitted for clarity.
Figure 16:
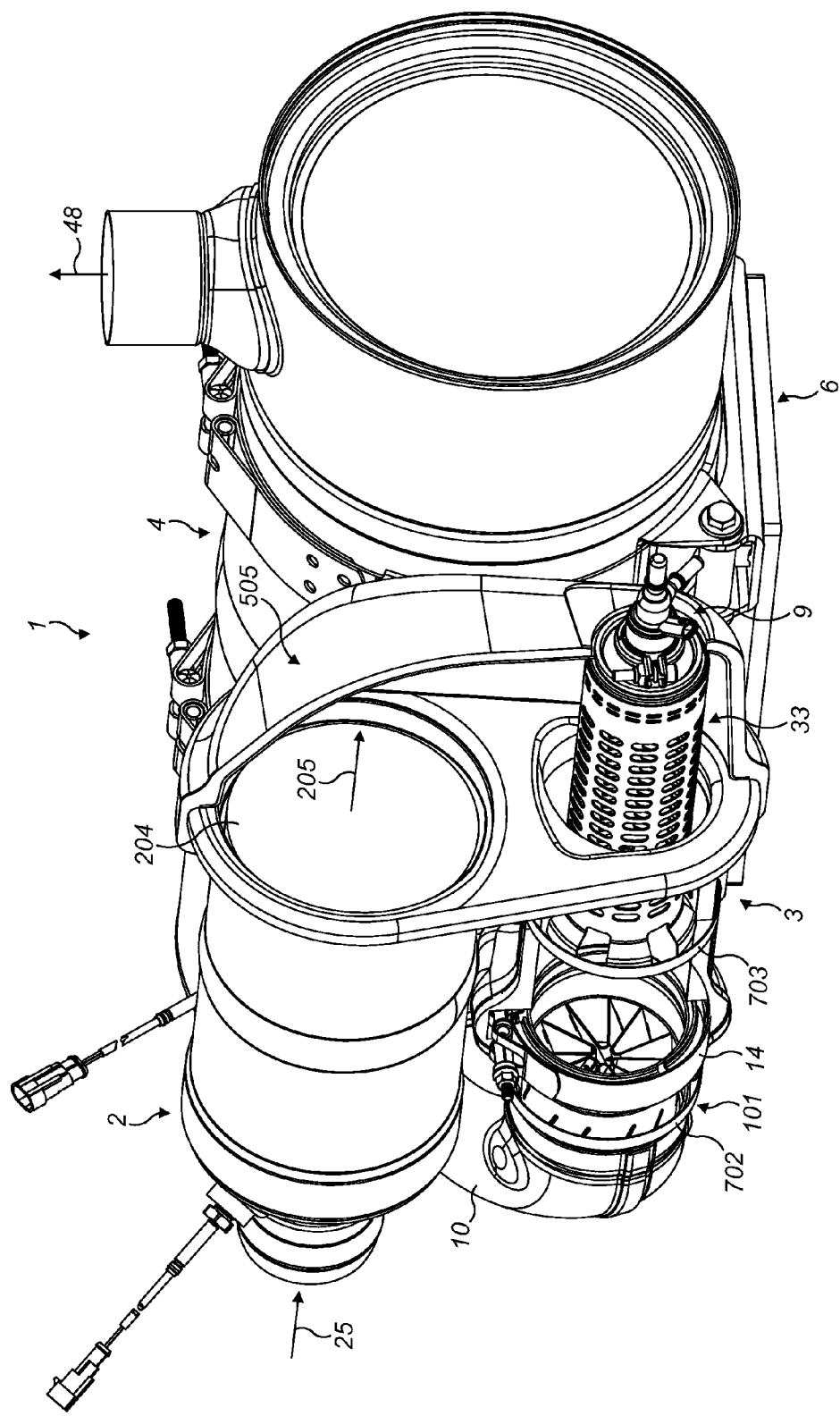
FIG. 16 shows the emissions cleaning module of FIG. 15 from another angle, again with certain parts omitted for clarity.
Figure 17:
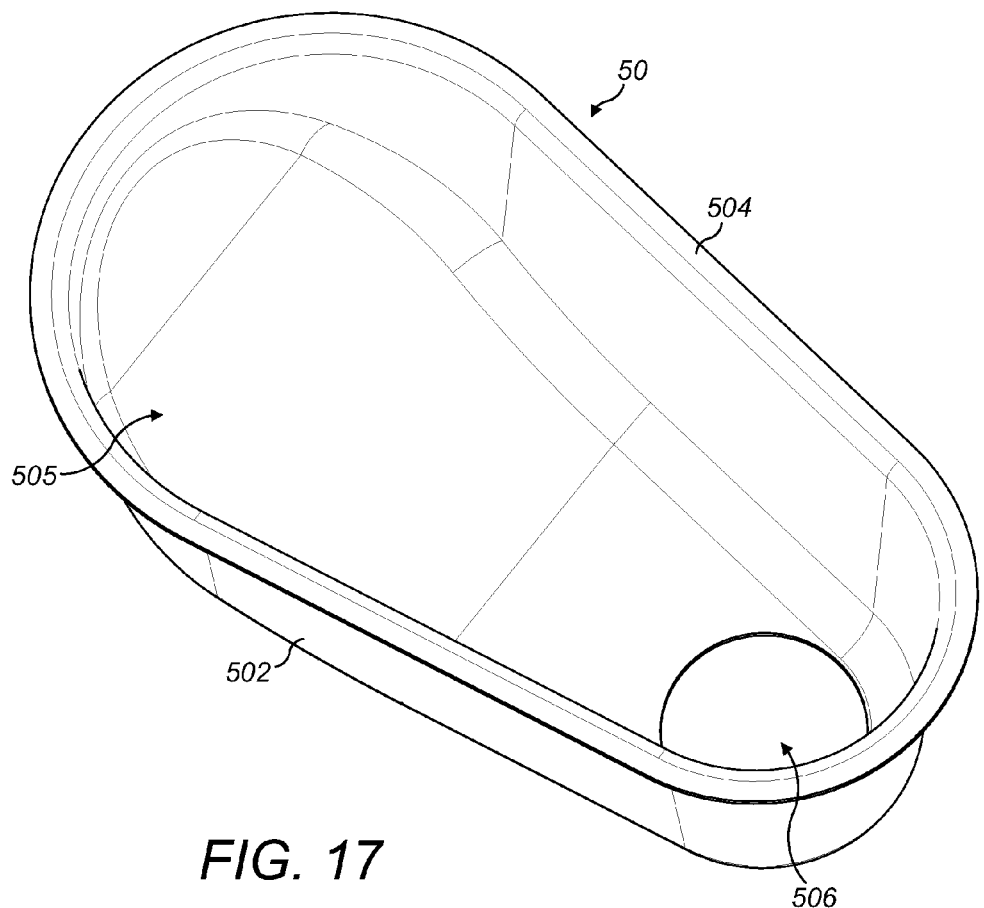
FIG. 17 shows a perspective view of a portion of the flow hood of FIG. 12.
Figure 18:
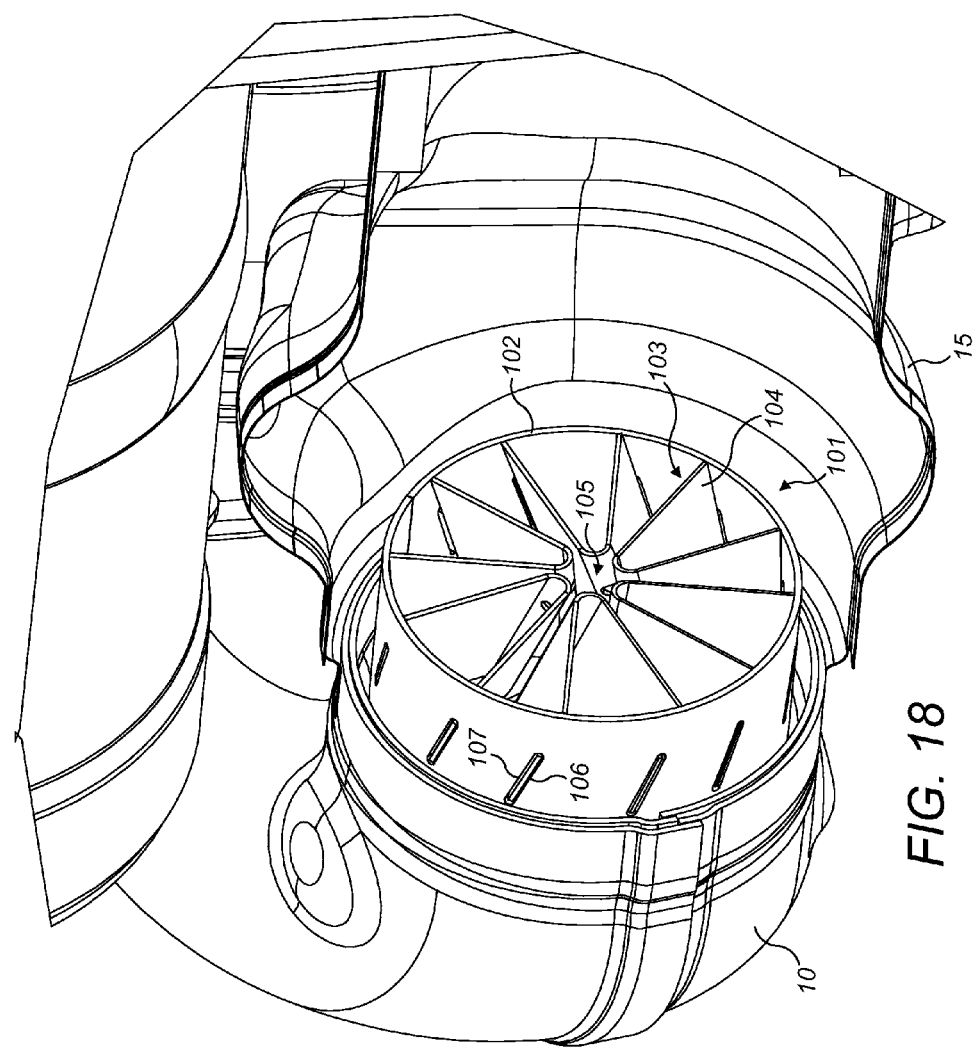
FIG. 18 shows a perspective view of a swirl unit of the emissions cleaning module of FIG. 1.

As shown in FIG. 13, the mixing element 33 may comprise an elongate body 306 which may be cylindrical and generally tubular A first end 304 of the elongate body 306 may be open and may be surrounded by a rim 313. An opposed end of the elongate body 306 may be open and may define an outlet 305 of the mixing element 33. A plurality of flared leg supports 311 may be provided at the outlet 305. Each flared leg support 311 may extend outwardly to define a portion of the mixing element 33 of enlarged diameter. As shown in FIG. 11, distal ends 312 of the flared leg supports 311 may make contact with an inner face 34 of the cylindrical body 31 and may be fastened thereto, for example by welding. The flared leg supports 311 may act to maintain the mixing element 33 in spaced relationship with the cylindrical body 31 such that a longitudinal axis of the elongate body 306 is parallel to the longitudinal axis 30 of the third conduit 3. The longitudinal axis of the elongate body 306 may be coaxial with the longitudinal axis 30 of the third conduit 3. Gaps may typically be provided between adjacent flared leg supports 311.

The rim 313 at the first end 304 may be mounted to the inner face 507 of the flowhood 5 and may be mounted so as to be received over the location of the aperture 506. The rim 313 may be flat. The rim 313 may be mounted to the inner face 507 so as to close off the first end 304 of the elongate body 306 (other than for the presence of the aperture 506—the use of which will be described below).

The elongate body 306 of the mixing element 33 may be provided with a plurality of apertures 307. A large number of apertures 307 may be provided. The apertures 307 may be arranged around the full circumference of the elongate body 306. Alternatively, the apertures 307 may be provided only on a portion of the circumference of the elongate body 306. In one example, the apertures 307 may only be provided on a 'lowermost' portion of the elongate body 306 when viewed in the orientation shown in FIG. 11 such that the apertures 307 face away from exhaust gas which, in use may be directed towards the mixing element 33 from the outlet 205 of the first conduit 2. The apertures 307 may be evenly arranged along the longitudinal axis of the elongate body 306.

A plurality of scavenging holes 308 may be provided at or near the first end 304. Thus, the scavenging holes 308 may be provided in proximity to the rim 313. The elongate body 306 may be provided with an un-apertured region between the scavenging holes 308 and the apertures 307.

A flow connector 10 may be provided to fluidly connect an outlet end 310 of the third conduit 3 with the second conduit 4. As shown in FIG. 1, the flow connector 10 may have an elbow-shaped configuration wherein a first end 121 of the flow connector 10 is aligned with the cylindrical body 31. A second end 122 of the flow connector 10 is oriented at approximately 90° to the first end 121 so as to connect to the second conduit 4 in a direction perpendicular to the longitudinal axis 40 of the second conduit 4. As shown in FIG. 11, the flow connector 10 may have a double skin construction comprising an outer wall 11 and an inner wall 12. A gap between the outer wall 11 and inner wall 12 may be provided as a void space or may alternatively be filled with an insulating material.

Figure 23:
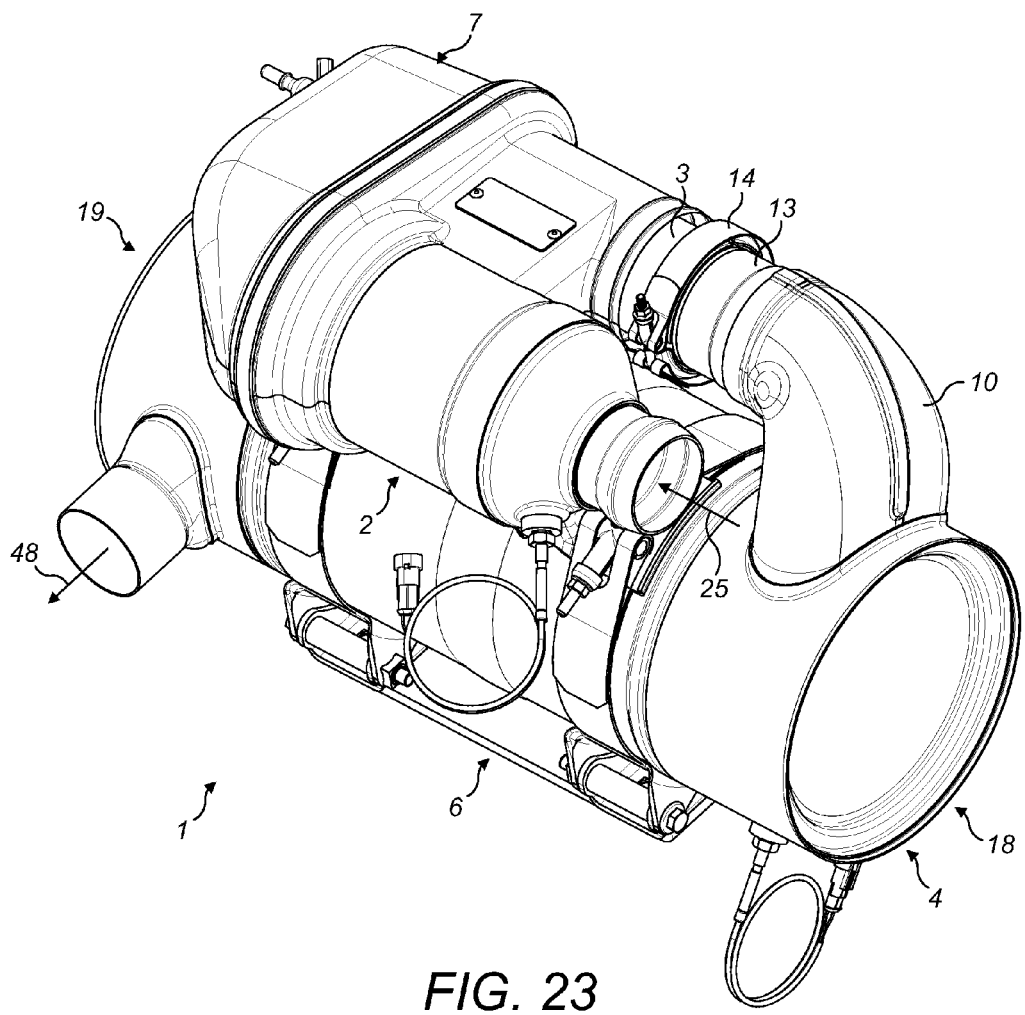
FIG. 23 shows a perspective view of the emissions cleaning module of FIG. 21 from another angle and with the clamp heat shield omitted.

The cylindrical body 31 of the third conduit 3 may be connected to the first end 121 of the flow connector 10 by means of a ring 13 and clamp 14 as shown in FIGS. 11 and 23, where FIG. 23 shows the ring 13 and clamp 14 as part of a second embodiment of emissions cleaning module which will be described below. Use of the ring 13 and clamp 14 may be identical in the first and second embodiments. An end of the cylindrical body 31 defining the outlet 310 of the third conduit 3 may be received in a first end of the ring 13 and a second end of the ring 13 may be mounted on the first end 121 of the flow connector 10. A clamp 14 may be provided to clamp the ring 13 to the cylindrical body 31 of the third conduit 3. The clamp 14 may be of a type whose diameter may be adjusted by a suitable mechanism. An example of a suitable clamp is a Teconnex™ clamp. Additional fastening means, such as welding, may be provided between the ring 13 and the cylindrical body 31 if desired. The ring 13 may be fastened to the flow connector 10 by means of a suitable fastening mechanism such as, for example, welding.

The end of the cylindrical body 31 defining the outlet 310 of the third conduit 3 may optionally be provided with a swirl unit 101 as shown in FIG. 11. The swirl unit 101 is shown in more detail in FIG. 18. The swirl unit 101 may comprise a cylindrical housing 102 having mounted thereto a plurality of blades 103. Each blade 103 may have a V-shaped form having two distal ends 107 which are mountingly received in slots 106 in the cylindrical housing 102. The faces of the blades 103 may be at an angle to the longitudinal axis 30 of the third conduit 3 such that exhaust gas flowing along the longitudinal axis 30 of the third conduit 3 and passing between the blades 103 will be induced to develop a swirling flow pattern. The blades 103 may extend towards, but stop short of, a centre of the swirl unit 101 so as to define a central bore 105 of the swirl unit 101 which is left open.

The swirl unit 101 may be mounted within the ring 13. The cylindrical housing 102 of the swirl unit 101 may be fastened to the ring 13 by a suitable means, for example welding.

Figure 3:
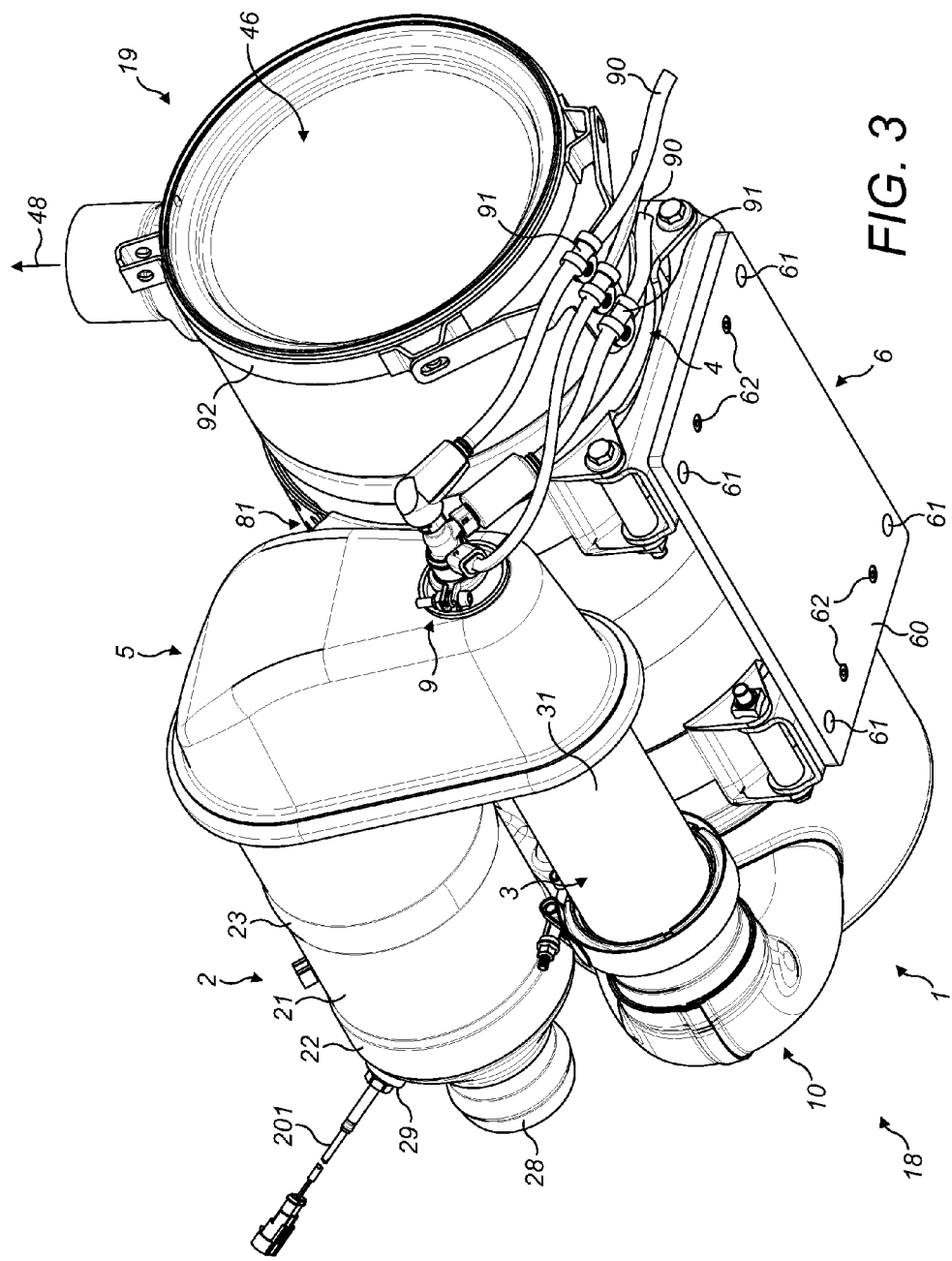
FIG. 3 shows a perspective view of the emissions cleaning module of FIG. 1 from a further angle.
Figure 4:
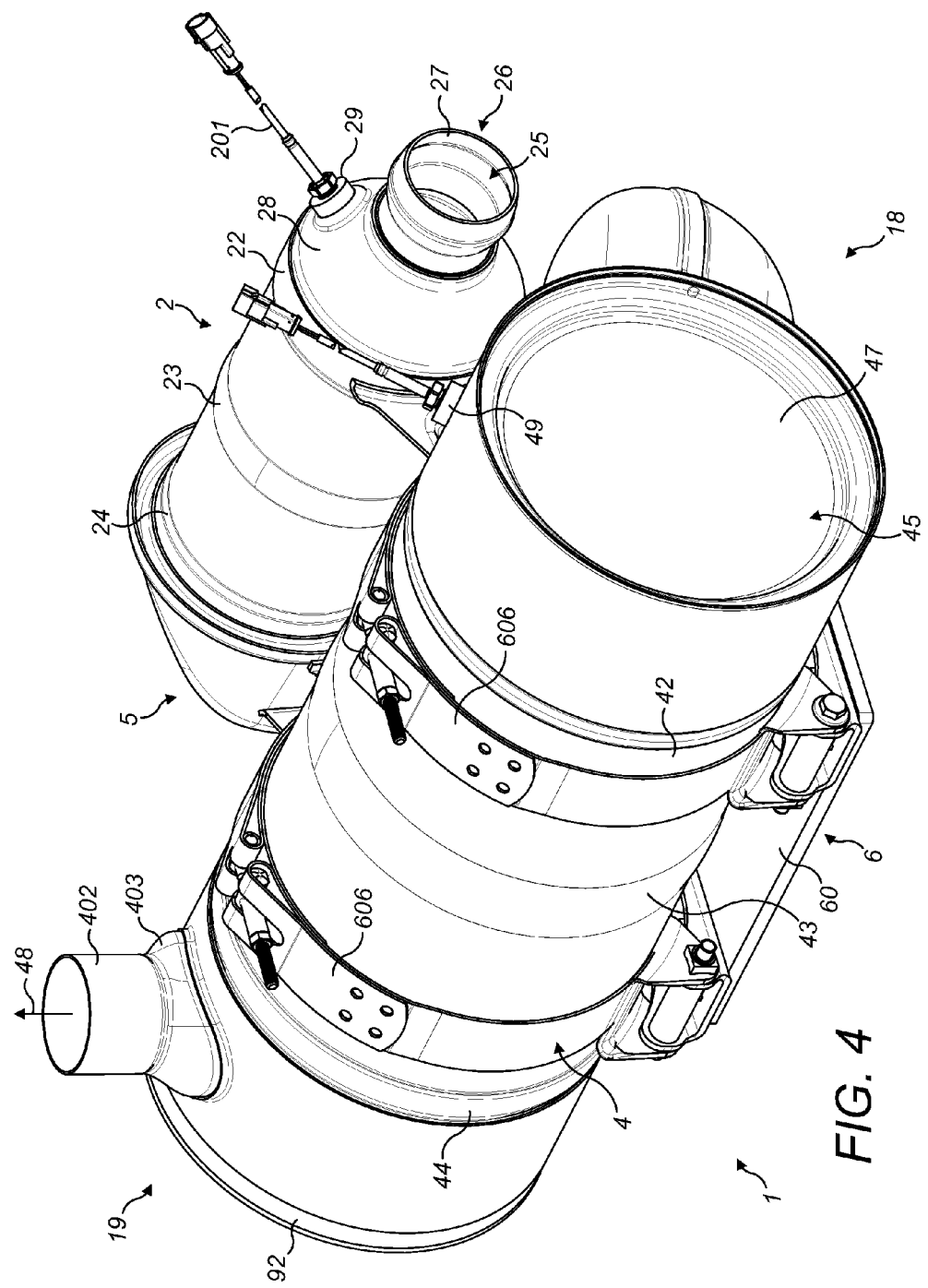
FIG. 4 shows a perspective view of the emissions cleaning module of FIG. 1 from a further angle.

An injector module 9 may be mounted in aperture 506 of the flowhood 5. As shown in FIG. 11, the injector module 9 may extend through the aperture 506 such that an outlet of the injector module 9 may be directed into the first end 304 of the mixing element 33. As shown in FIG. 3, one or more injector lines 90 may interconnect the injector module 9 with a supply of injector fluid (not shown). A clamping band 92 may optionally be fitted to the second conduit 4. The clamping band 92 may be provided with one or more clip mounts 92 to which the injector lines 90 can be secured by use of injector line clips 91.

The second conduit 4 may comprise a cylindrical body 41. A first end section 45 may be sealingly connected to the cylindrical body 41 at an end of the cylindrical body 41 nearest the first end 18 of the emissions cleaning module 1. A second end section 46 may be sealingly connected to the cylindrical body 41 at an end of the cylindrical body 41 nearest the second end 19 of the emissions cleaning module 1.

The first end section 45 may define a closed first end 47 of the second conduit 4. The flow connector 10 may be fluidly connected to the first end section 45. The second end section 46 may be provided with an outlet connector defining an outlet 48 of the second conduit 4. The outlet connector may comprise a conical section 403 that may be mounted to the second end section 46 and which may taper to join with a cylindrical mounting pipe 402 which may define an outlet 48 of the second conduit 4. In use, a section of external pipe work forming a portion of an exhaust arrangement may be connected to the cylindrical mounting pipe 402.

The cylindrical body 41 may comprise a first ridge 42, a second ridge 43 and a third ridge 44 which may lie proud of a remainder of the cylindrical body 41 and which may be spaced along the longitudinal axis 40. The first ridge 42 may be located nearest the first end 18.

The third ridge 44 may be located nearest the second end 19. The second ridge 43 may be located in between the first ridge 42 and the third ridge 44.

The second conduit 4 may contain an SCR module. The SCR module may be located within the cylindrical body 41 towards the first end 18 of the emissions cleaning module 1. The second conduit 4 may also contain an AMOX module. The AMOX module may be located within the cylindrical body 41 towards the second end 19 of the emissions cleaning module 1 so as to be downstream of the SCR module. Alternatively, a combined SCR-AMOX module may be provided in place of the AMOX module.

A temperature sensor 49 may be mounted in the second conduit 4. As shown in FIG. 1, the temperature sensor 49 may be mounted in the first end section 45. The temperature sensor 49 may be located immediately upstream of the SCR module. The temperature sensor 49 may extend into an interior of the second conduit 4. The temperature sensor 49 may be connected to an engine control module (not shown) by means of a temperature sensor lead 401.

Figure 6:
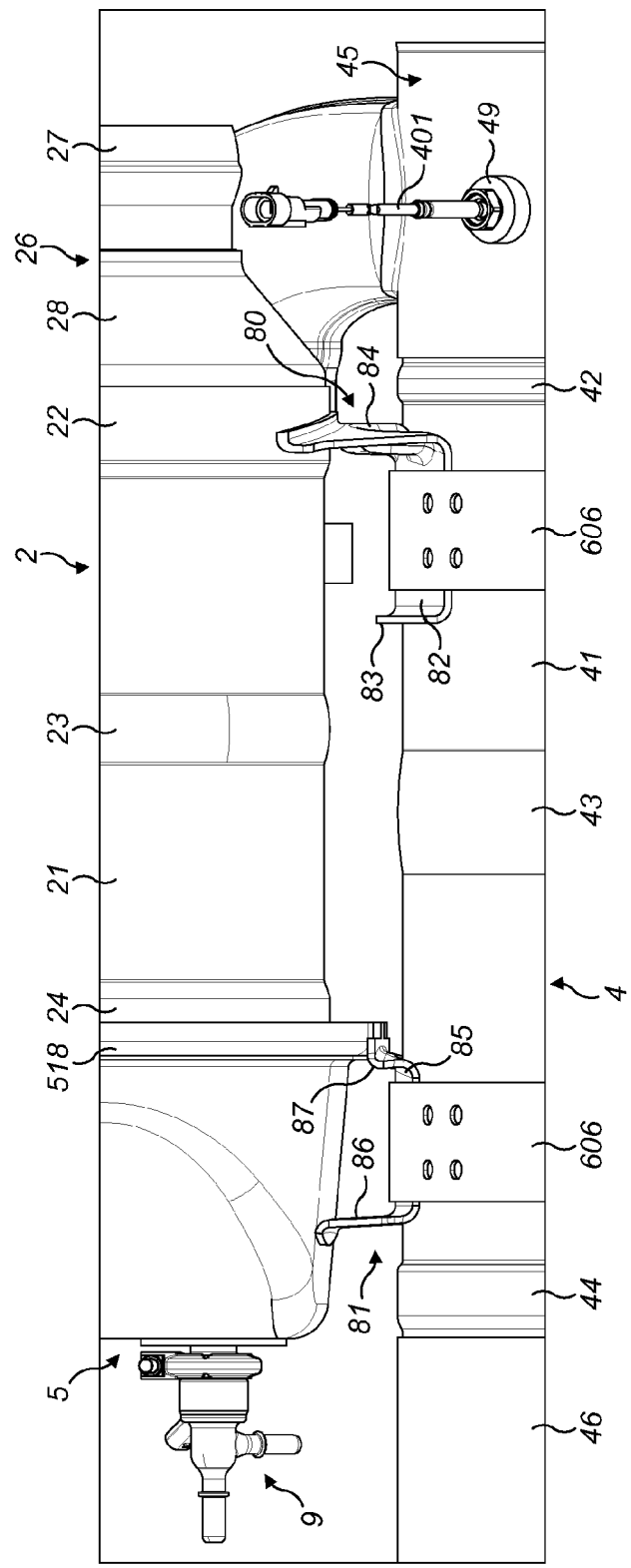
FIG. 6 shows a side view of a portion of the emissions cleaning module of FIG. 1.

As shown in FIG. 6, the first conduit 2 may be mounted to the second conduit 4. The first conduit 2 may be mounted to the second conduit 4 by means of a first leg 80 which may extend between the cylindrical body 21 of the first conduit and the cylindrical body 41 of the second conduit 4. The first leg 80 may comprise a base 82 and a flange 84 which may be orientated perpendicularly to one another. The flange 84 may be welded to the cylindrical body 21. The base 82 may be curved so as to conform to the shape of the cylindrical body 41. The base 82 may be retained against the cylindrical body 41 by means of a strap 606 which will be described further below with reference to a first mounting mechanism 6. The strap 606 may overlie the base 82. The base 82 may be provided with an upturned lip 83 on an edge opposed to the flange 84. The upturned lip 83 may serve to prevent the strap 606 sliding off the base 82.

A second leg 81 may further be provided to mount the first conduit 2 to the second conduit 4. The second leg 81 may extend between the cylindrical body 41 of the second conduit 4 and the flowhood 5. The second leg 81 may comprise a base 85 which is mounted to the cylindrical body 41 and a first flange 86 and a second flange 87 both of which may be mounted to the flowhood 5. The first flange 86 and the second flange 87 may extend perpendicularly from opposed sides of the base 85 such that the second leg 81 may have a generally U-shaped cross-section as viewed in FIG. 6. The first flange 86 may be welded to the side wall 502 of the first section 50 of the flowhood 5. The second flange 87 may be welded to the flange 518 of the second section 51 of the flowhood 5. The base 85 may be curved so as to conform to the shape of the cylindrical body 41. The base 85 may be retained against the cylindrical body 41 by means of another strap 606. The first conduit 2 may be mounted directly to the second conduit 4 at one end and may be mounted indirectly to the second conduit 4 via the flowhood 5 at the other end. It may be noted that the first conduit 2 is not directly supported by the first mounting mechanism 6 that will be described further below. Rather, the first conduit 2 is only indirectly supported by the first mounting mechanism 6 via the second conduit 4.

As shown in FIGS. 7 to 10, a heat shield 7 may be provided as part of the emissions cleaning module 1. The heat shield 7 may act to reduce the transmission of thermal emissions to the surroundings of the emissions cleaning module 1. The heat shield 7 may also act to help maintain an elevated temperature within portions of the emissions cleaning module 1.

Figure 7:
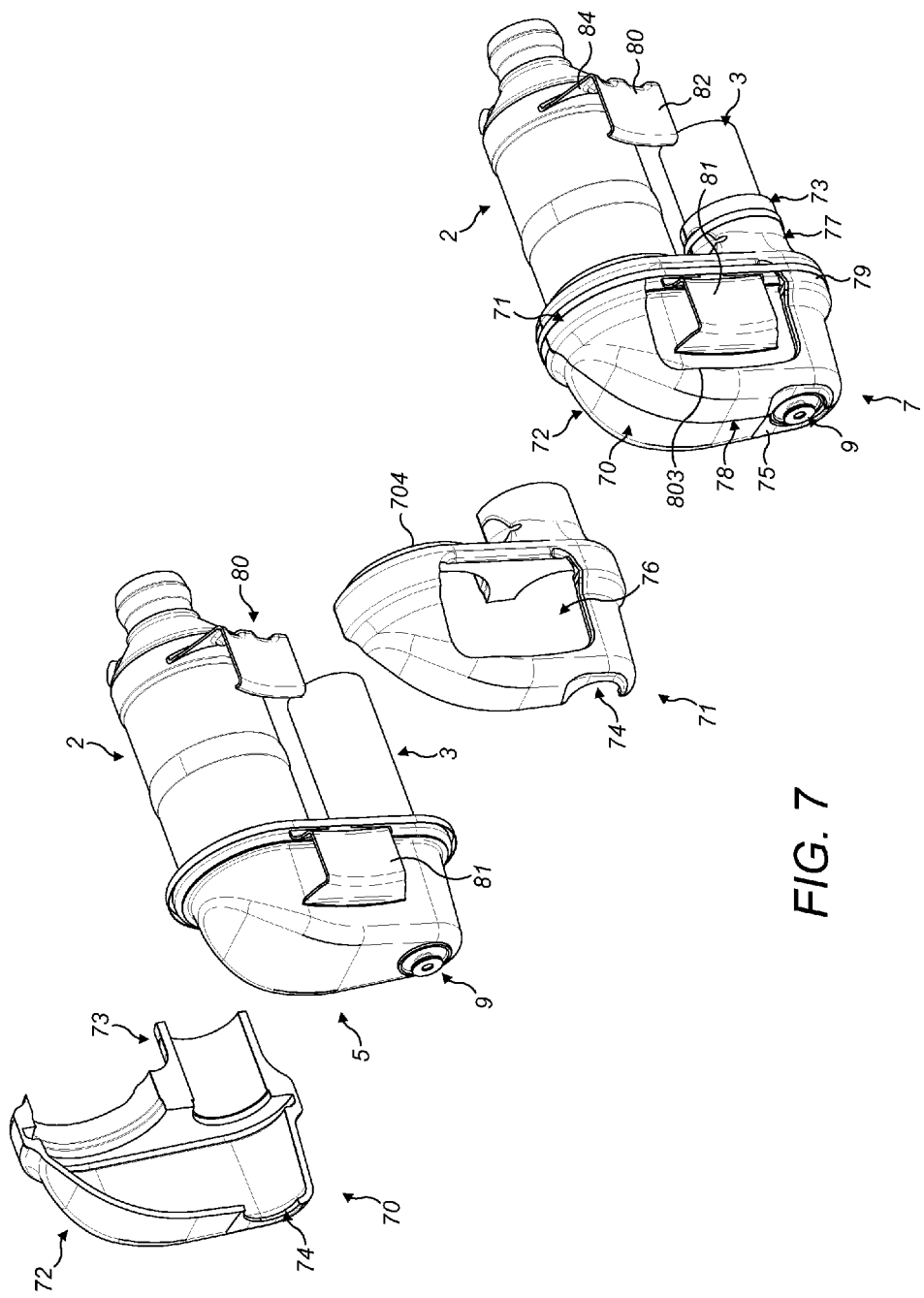
FIG. 7 shows an exploded perspective view, and an assembly view, of a portion of the emissions cleaning module of FIG. 1 together with a heat shield.
Figure 8:
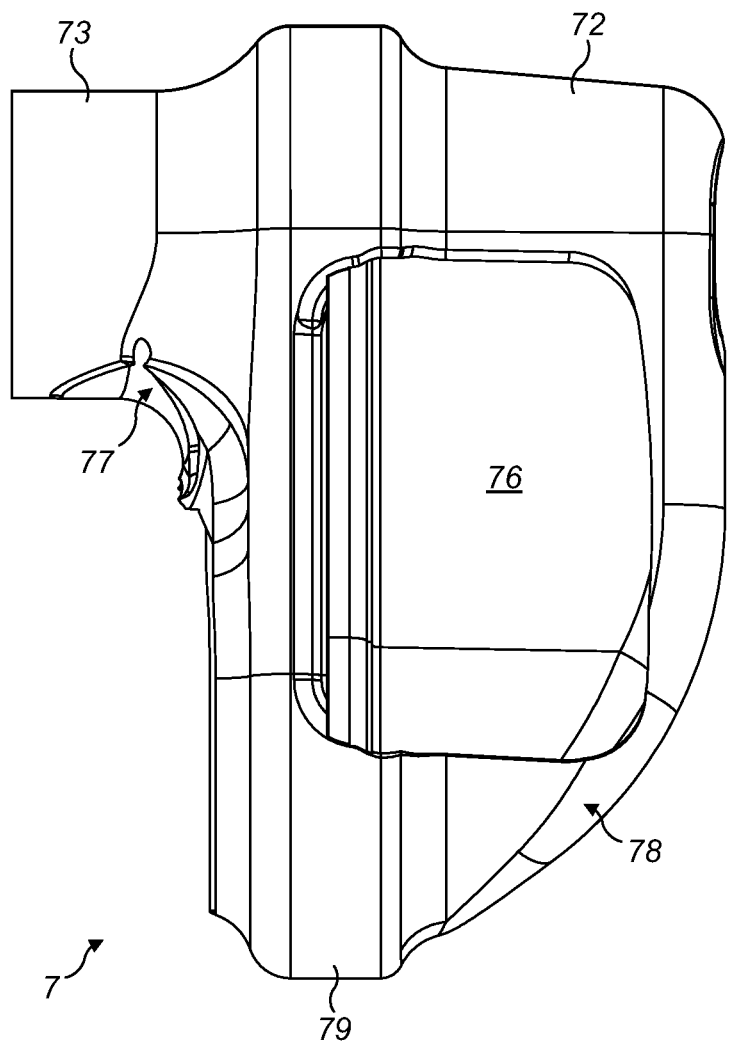
FIG. 8 shows a side view of the heat shield of FIG. 7.

The heat shield 7 may be designed to substantially fully envelop all external surfaces of the flowhood 5. By "substantially fully envelop" the reader will understand that the heat shield 7 may be provided with one or more apertures as necessary to allow a mounting mechanism for the flowhood 5 to emerge from the heat shield 7 and for the injector module 9 to be mounted. For example, as illustrated in FIG. 7, the heat shield 7 may comprise an aperture 74 and a mounting aperture 76 which will be described further below. In addition, the heat shield 7 may be configured to envelop at least a portion of the cylindrical body 31 of the third conduit 3. In addition, the heat shield 7 may be configured to envelop at least a portion of the cylindrical body 21 of the first conduit 2 near where it is connects to the first aperture 54 of the flowhood 5.

Figure 9:
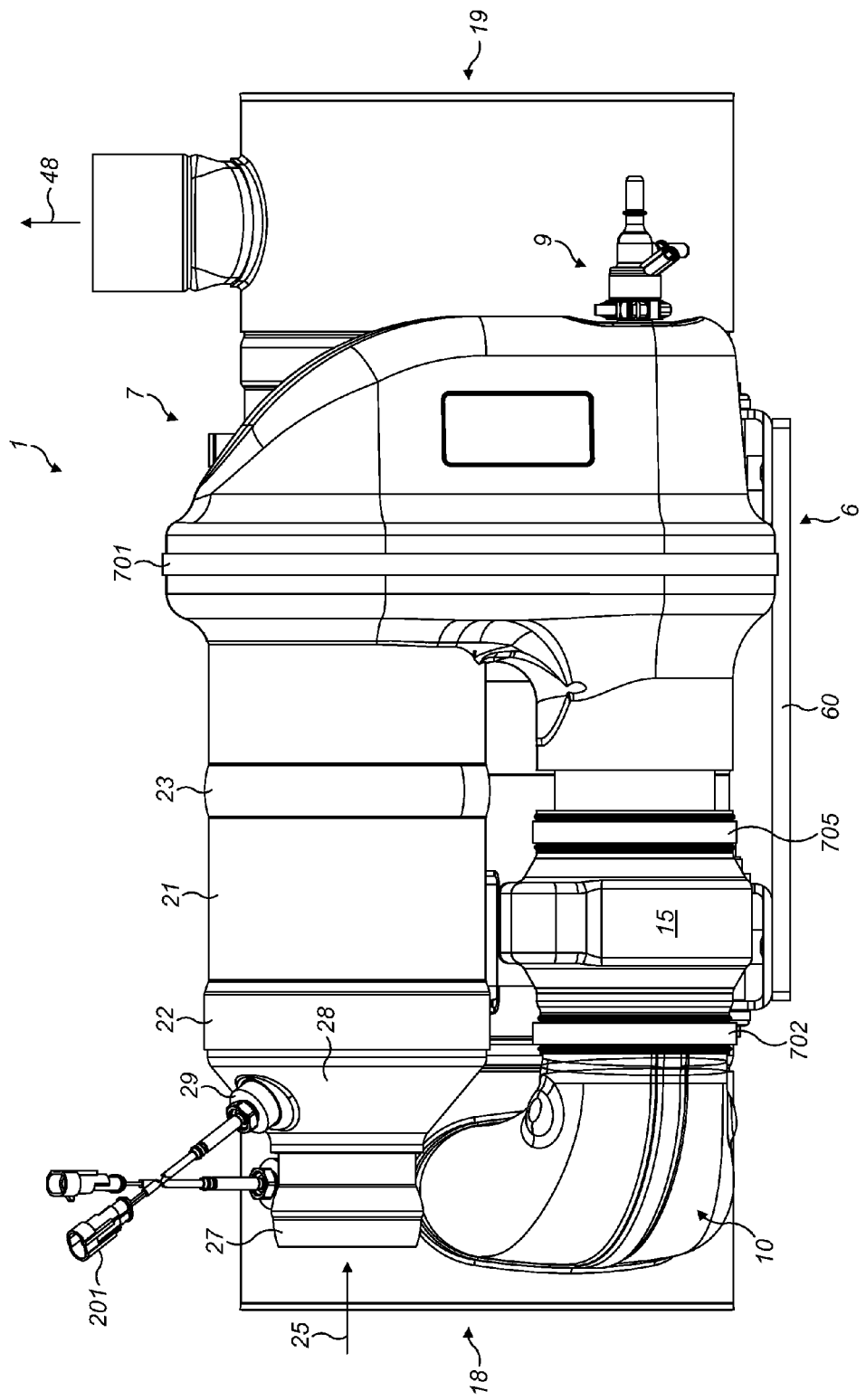
FIG. 9 shows a side view of the emissions cleaning module of FIG. 1 with the heat shield of FIG. 8 and a clamp heat shield mounted thereto.

As shown in FIG. 7, the heat shield 7 may comprise a first section 70 and a second section 71 which may be coupled together around the flowhood 5. The first section 70 and the second section 71 may be fastened together by welding. As shown in FIG. 9, in addition or alternatively to welding, the first section 70 and the second section 71 may be coupled and retained together by means of a retaining band 701 which may be a metal band or strap.

The first section 70 and the second section 71 may form a first half shell and a second half shell of the heat shield 7. When coupled together, a join or interface between the first section 70 and the second section 71 may lie on or in proximity to a mid line of the heat shield 7.

As shown in FIG. 7, the heat shield 7 comprises a flowhood covering 72 which is shaped to overlie the flowhood 5. The flowhood covering 72 may be shaped to closely follow the contours of an external surface of the flowhood 5. The heat shield 7 may further comprise a cylindrical section 77 which is shaped to overlie at least a portion of the cylindrical body 31 of the third conduit 3. The cylindrical section 77 may be shaped to closely follow the contours of the external surface of the cylindrical body 31. The cylindrical section 77 may extend to cover a portion of the cylindrical body 31. The heat shield 7 may further comprise an enlarged rim section 79 which is shaped to overlie the flange 504 and flange 518 of the flowhood 5. The enlarged rim section 79 may be shaped to closely follow the contours of the flange 504 and flange 518. The heat shield 7 may further comprise a cylindrical section 704 which may be relatively short and shaped to overlie a connecting region between the cylindrical body 21 of the first conduit 2 and the flowhood 5. The cylindrical section 704 may be shaped to closely follow the contours of the external surface of the cylindrical body 21. The cylindrical section 704 may be significantly shorter than the cylindrical section 77.

The heat shield 7 may be provided with an aperture 74 through which on assembly the injector module 9 projects. The aperture 74 may be provided at the base of a recess 75 surrounding the aperture 74. The aperture 74 may be provided at the interface between the first section 70 and second section 71 of the heat shield 7 such that the aperture 74 may be delimited by edges of the first section 70 and second section 71. This may allow the injector module 9 to first be mounted to the flowhood 5 and thereafter the first section 70 and second section 71 of the heat shield 7 to be coupled together about the injector module 9.

The second section 71 of the heat shield 7 may be provided with a mounting aperture 76. This may be configured to permit the second leg 81 to project through the heat shield 7 to provide access for mounting the strap 606 to the second leg 81 with the heat shield 7 in place on the first conduit 2.

As shown in FIG. 9, a clamp heat shield 15 may additionally be provided. The clamp heat shield 15 may be designed to substantially fully envelop all external surfaces of the clamp 14 and/or ring 13. In addition, the clamp heat shield 15 may be configured to envelop a portion of the cylindrical body 31 which is not enveloped by the heat shield 7. Thus, in combination, the heat shield 7 and the clamp heat shield 15 may envelop the majority or even the whole of the third conduit 3.

Figure 25:
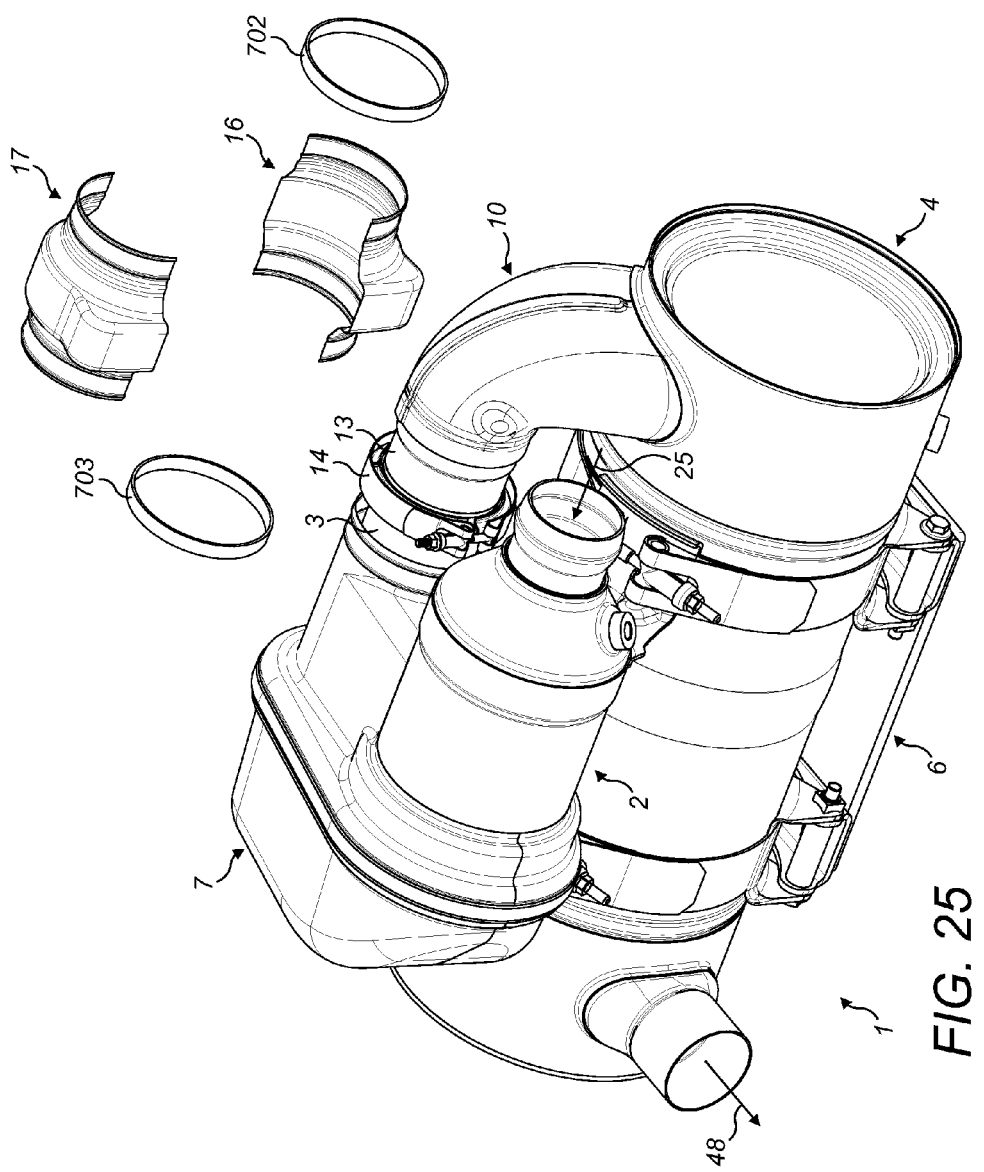
FIG. 25 shows the emissions cleaning module of FIG. 23 together with an exploded view of the clamp heat shield.
Figure 26:
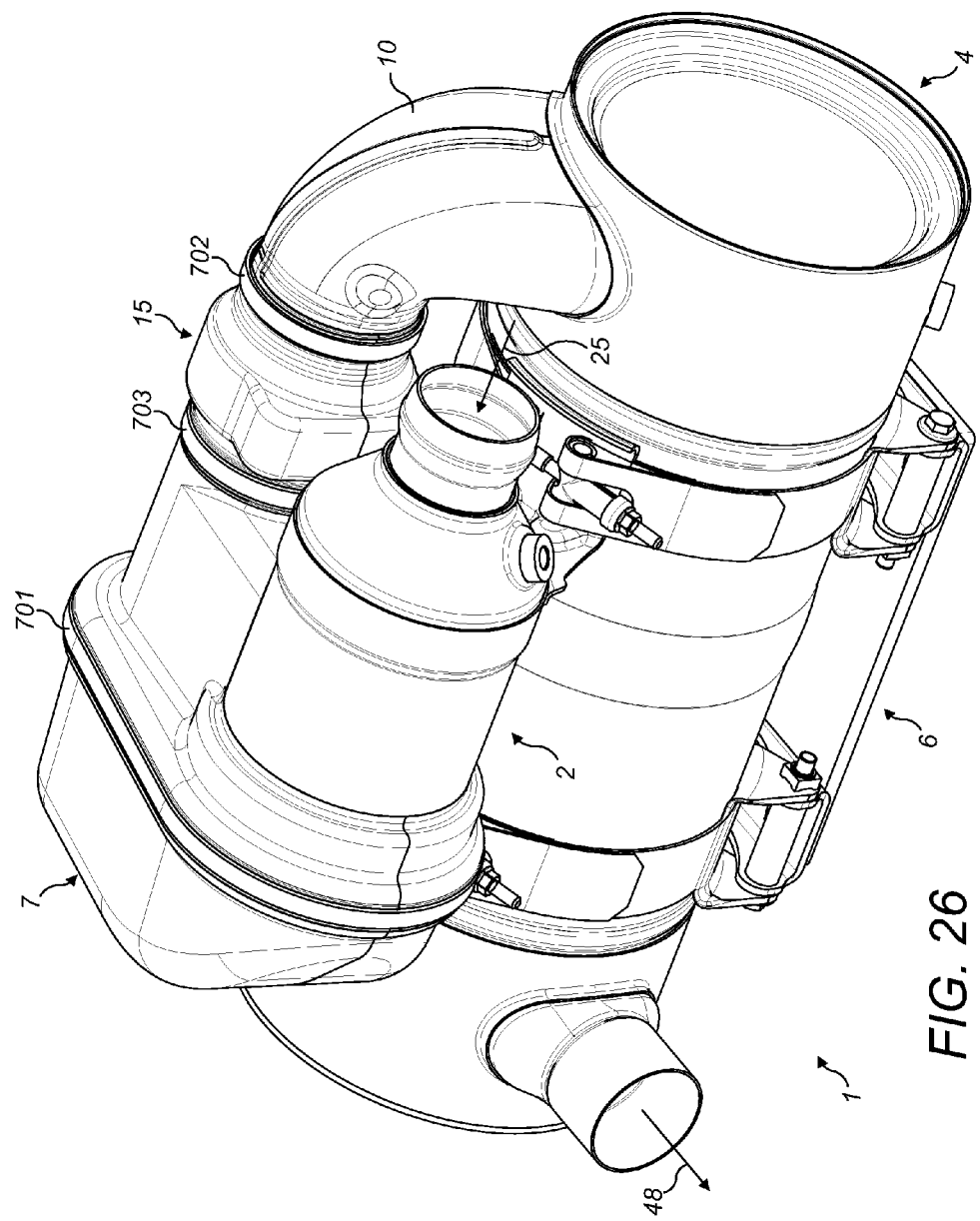
FIG. 26 shows a perspective view of the emissions cleaning module of FIG. 21 from another angle.

As shown in FIG. 25 (with reference to the second embodiment of emissions cleaning module 1), the clamp heat shield 15 may comprise a first clamp section 16 and a second clamp section 17 which may be coupled together around the clamp 14. The first clamp section 16 and the second clamp section 17 may be fastened together by welding. In addition or alternatively to welding, the first clamp section 16 and the second clamp section 17 may be coupled and retained together by means of retaining bands 702, 703 which may be a metal band or strap. The retaining band 703 may also act to aid coupling of the first section 70 and second section 71 of the heat shield 7.

Figure 5:
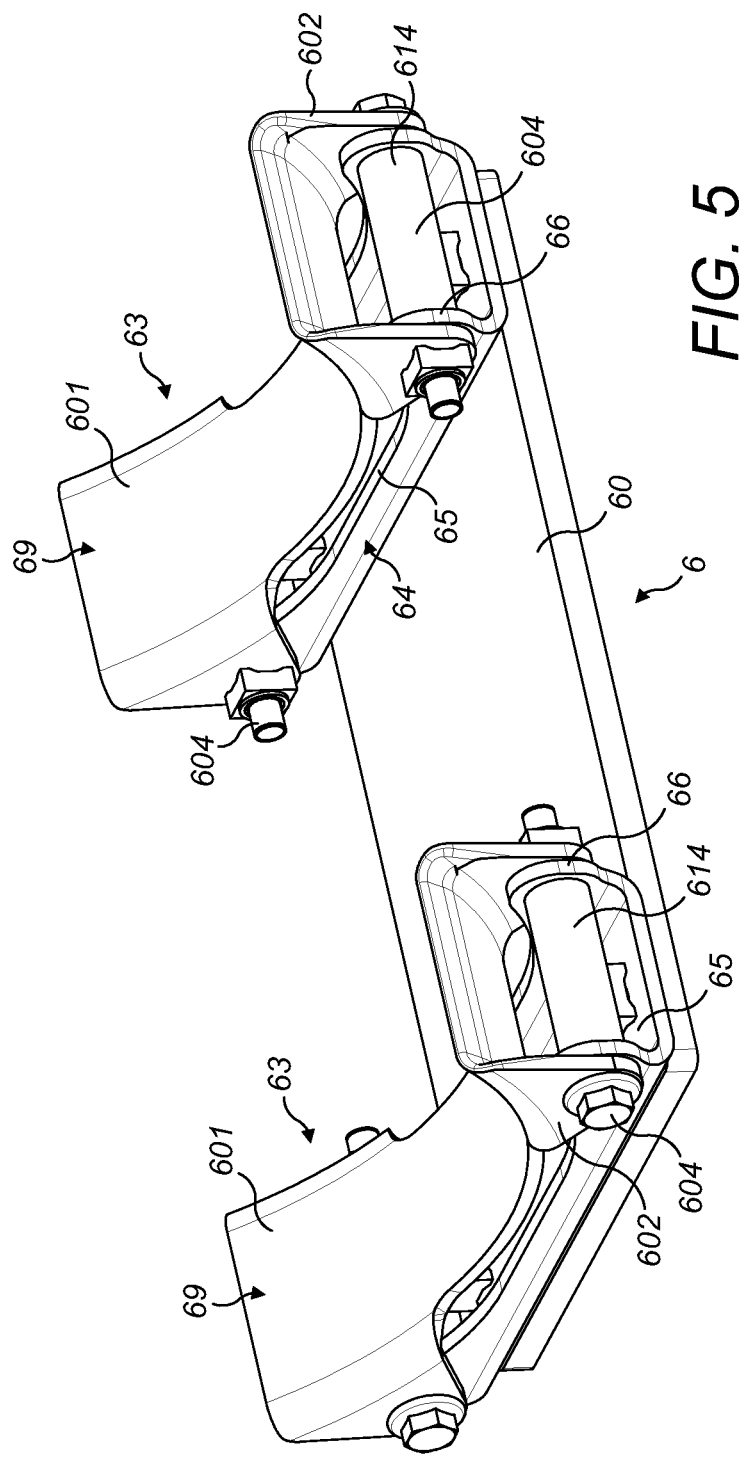
FIG. 5 shows a perspective view of part of a mounting mechanism of the emissions cleaning module of FIG. 1.

A first mounting mechanism 6 may be provided for mounting the emissions cleaning module 1 to an external support or mount, for example a chassis. Certain components of the first mounting mechanism 6 are shown in FIG. 5. As shown, the first mounting mechanism 6 comprises a mounting plate 60 having fastened thereto two mounting saddles 63.

The mounting saddles 63 may be designed to distort in order to conform to the cylindrical body 41 of the second conduit 4 mounted thereon. This may be useful since the SCR catalyst brick inside the conduit, and hence the conduit 4, may vary in diameter either along its length or between different bricks derived from the same production line. This capacity to distort may also reduce stress in the first mounting mechanism 6 and improve retainment (i.e. increase natural frequency) of the second conduits 4 on the mounting plate 60. The mounting saddles 63 may each have an upper surface 601 for supporting the second conduit 4. The upper surface 601 is flexible so as to conform substantially to a portion of the second conduit 4 located thereon.

Figure 24:
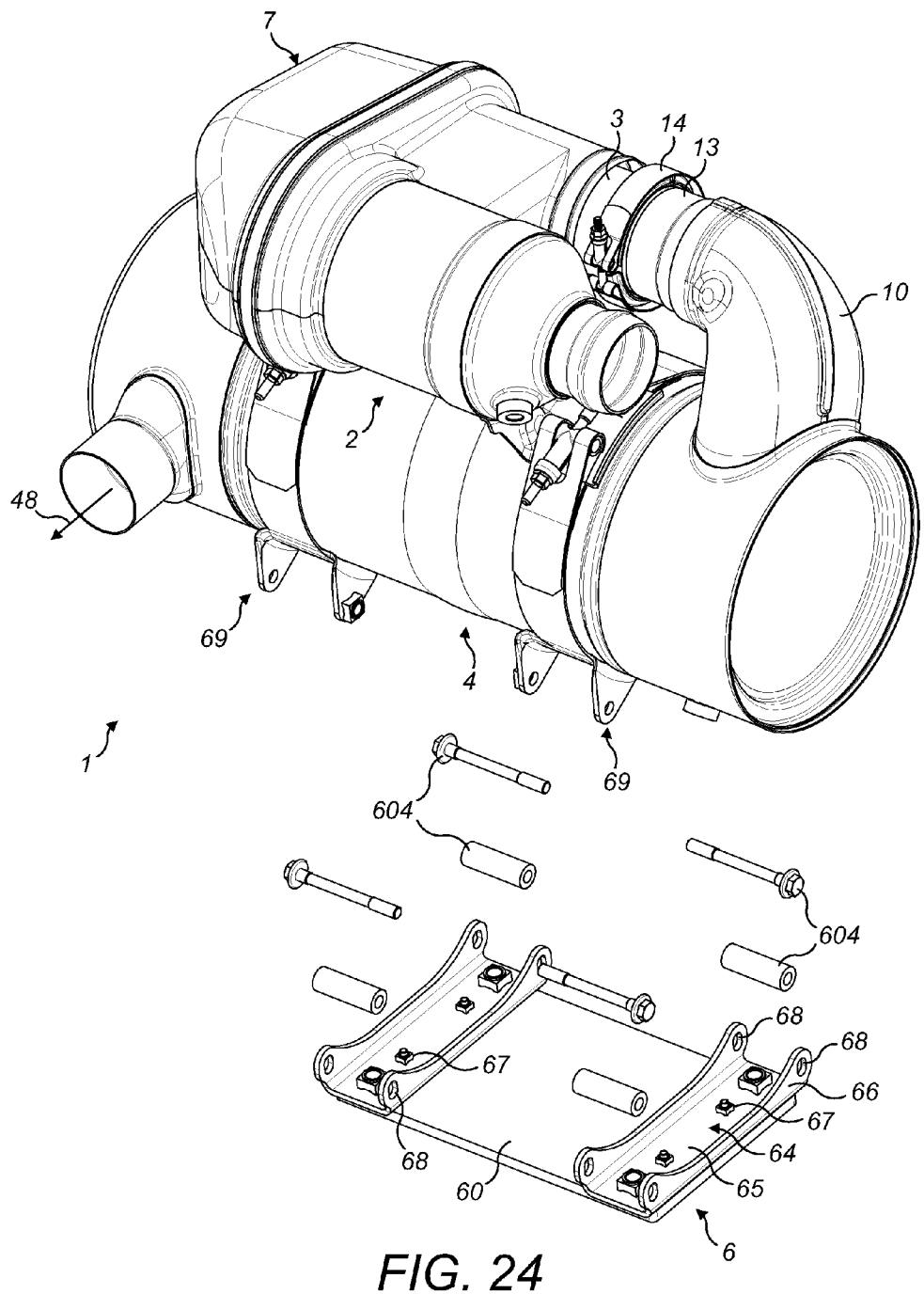
FIG. 24 shows a part exploded perspective view of the emissions cleaning module of FIG. 23.

Each mounting saddle 63 may comprise a lower element 64 and an upper element 69. The lower element 64 may comprise a flat base 65 having upwardly extending flanges 66 on each side. Bolt holes 67 may be provided for fastening the lower elements 64 to the mounting plate 60 by means of bolts, as most clearly seen in FIG. 24 which illustrates the same first mounting mechanism 6 when utilised with a second embodiment of emissions cleaning module 1 which will be described below. The use of the mounting plate 60 is optional, as in an alternative arrangement the lower elements 64 may be directly mounted to the external support or mount. Each mounting saddle 63 is separate from each other mounting saddle 63 (before mounting). This allows for the location, orientation and mounting of the mounting saddles 63 to be defined independently of one another.

The flanges 66 of the lower element 64 may each have an enlarged lobe section at each end in each of which may be formed a hole 68. Thus each lower element 64 may have two pairs of holes 68.

The upper element 69 of each mounting saddle 63 may comprise said curved upper surface 601 which may be shaped to conform to the cylindrical body 41 of the second conduit 4. The upper element 69 may be provided with a pair of flanges 602 at each end which extend downwardly and may have formed therein holes 603. As shown in FIG. 5, the upper elements 69 may thus be mounted to the lower element 64 by means of fastening means 604, such as bolts, which may pass through the pairs of holes 68 and 603 in the lower element 64 and upper element 69 respectively. The mounting saddles 63 may be provided with cylindrical spacers 614 overlying the fastening means 604 which may extend between the flanges 66. The cylindrical spacers 614 may act to strengthen the lowers elements 64 and help prevent distortion when the fastening means 604 are tightened. The holes may be circular or slotted.

Figure 22:
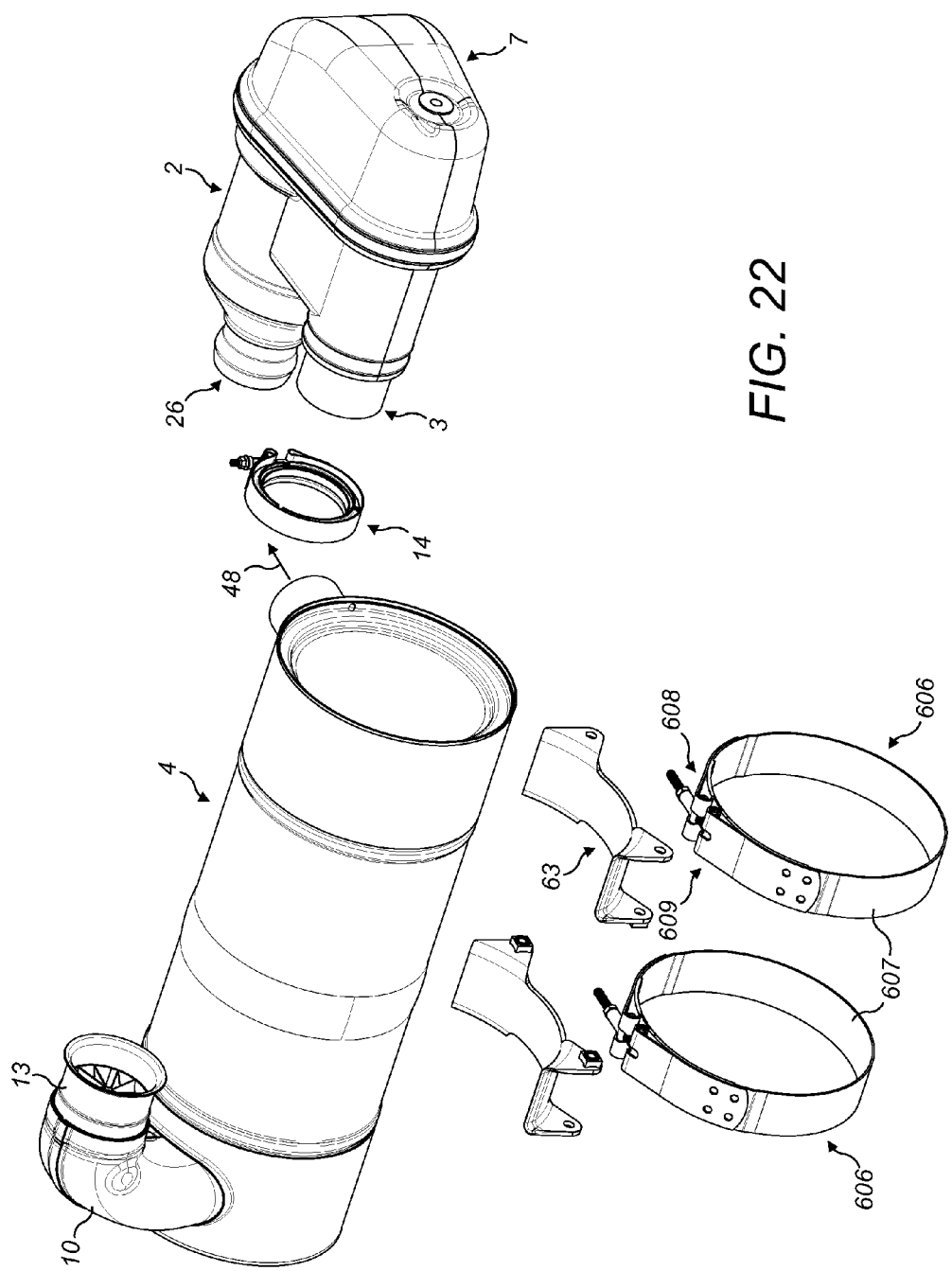
FIG. 22 shows an exploded perspective view of portions of the emissions cleaning module of FIG. 21.

As shown in FIG. 22, the first mounting mechanism 6 may further comprise a pair of straps 606 which may extend around the cylindrical body 41 of the second conduit 4 and pass through the mounting saddles 63 between the lower element 64 and the upper element 69. Each strap 606 may comprise an elongate member 607 which may be formed from a metal band. A first strap 606 may be located between the first ridge 42 and the second ridge 43 of the cylindrical body 41. A second strap 606 may be located between the second ridge 43 and the third ridge 44.

Figure 10:
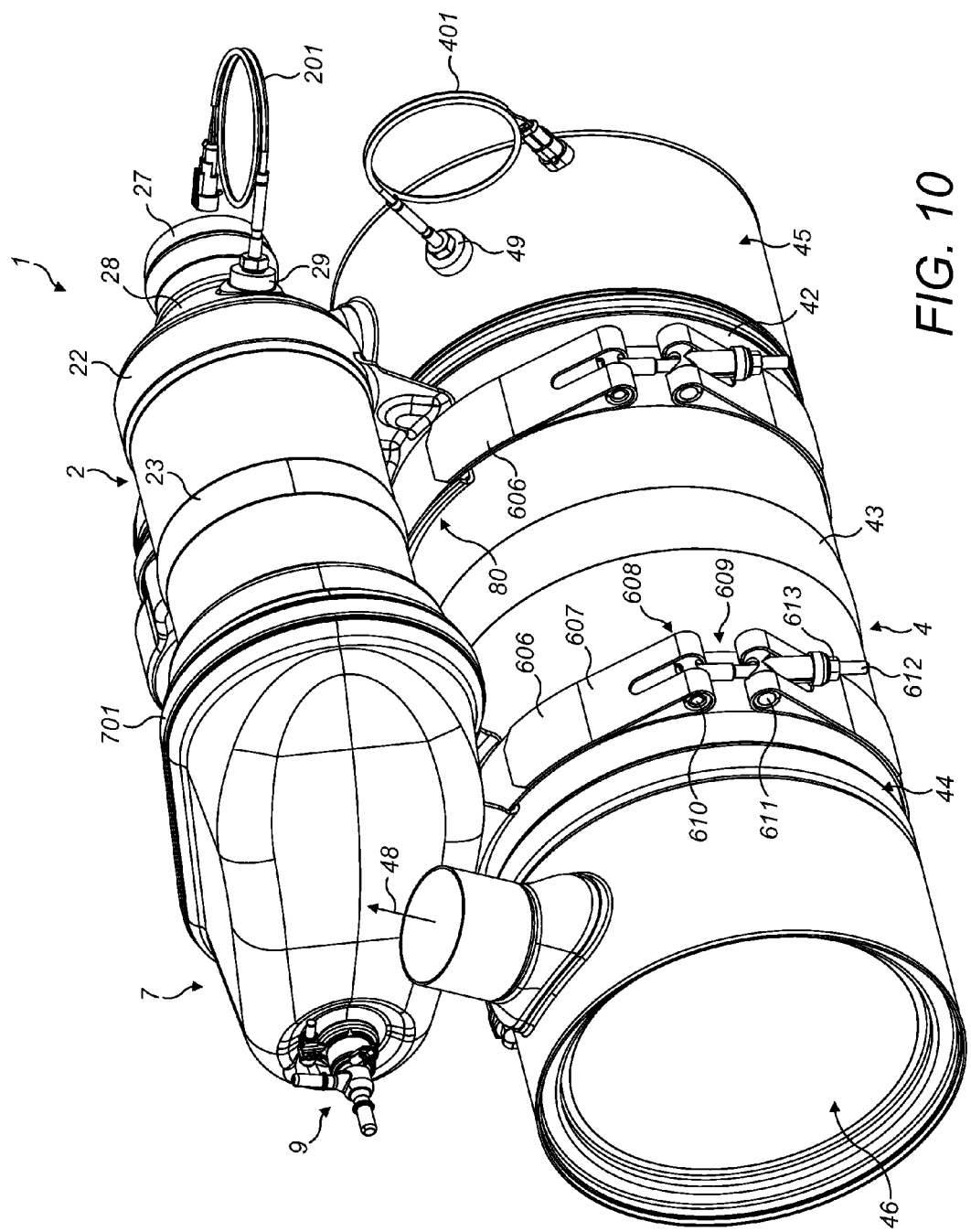
FIG. 10 shows a perspective view of the emissions cleaning module of FIG. 9 from another angle.

At each end of the elongate member 607, a pair of end loops 608 may be formed which may receive co-operating portions of an adjustable clamp 609. As shown in FIG. 10, each adjustable clamp 609 may comprise a first fixing 610 received in a pair of end loops 608 at one end of the elongate member 607 and a second fixing 611 received in the pair of end loops 608 at the other end of the elongate member 607. A threaded connector 612 may be provided which may be mounted to the first fixing 610 and extend through an aperture in the second fixing 611. A nut adjuster 613 may be received on the threaded connector 612 and by movement of the nut adjuster 613 along the threaded connector 612, the distance between the co-operating portions may be adjusted and hence the circumference of the strap 606 may be adjusted.

As the adjustable straps 606 are tightened around the cylindrical body 41 the upper surfaces 601 flex to conform to the portion of the second conduit 4 located thereon. The fastening means may then be tightened to hold the upper surfaces 601 rigid. This configuration may enable second conduits 4 having different curvatures to be securely supported.

Figure 19:
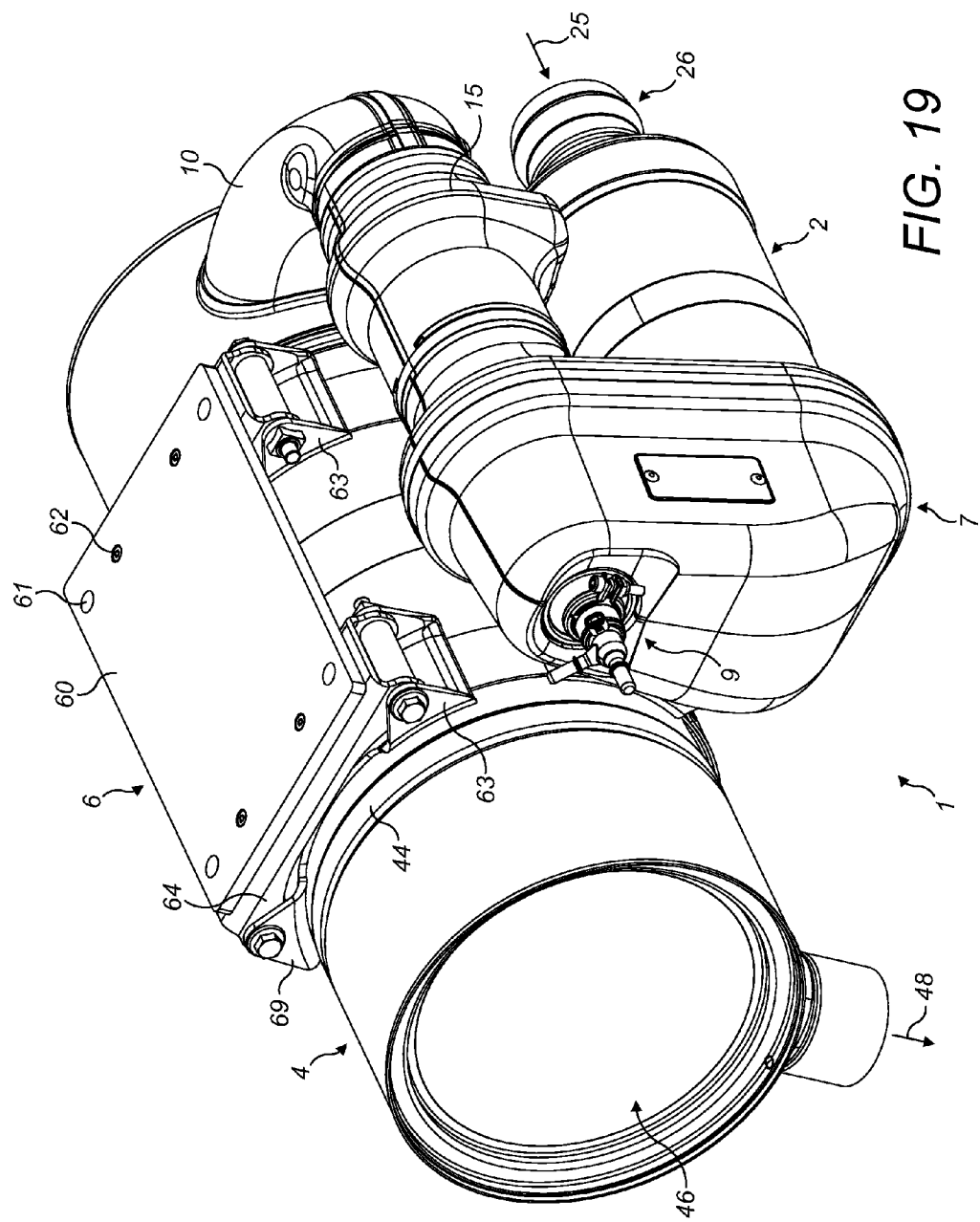
FIG. 19 shows the emissions cleaning module of FIG. 1 from another angle.
Figure 20:
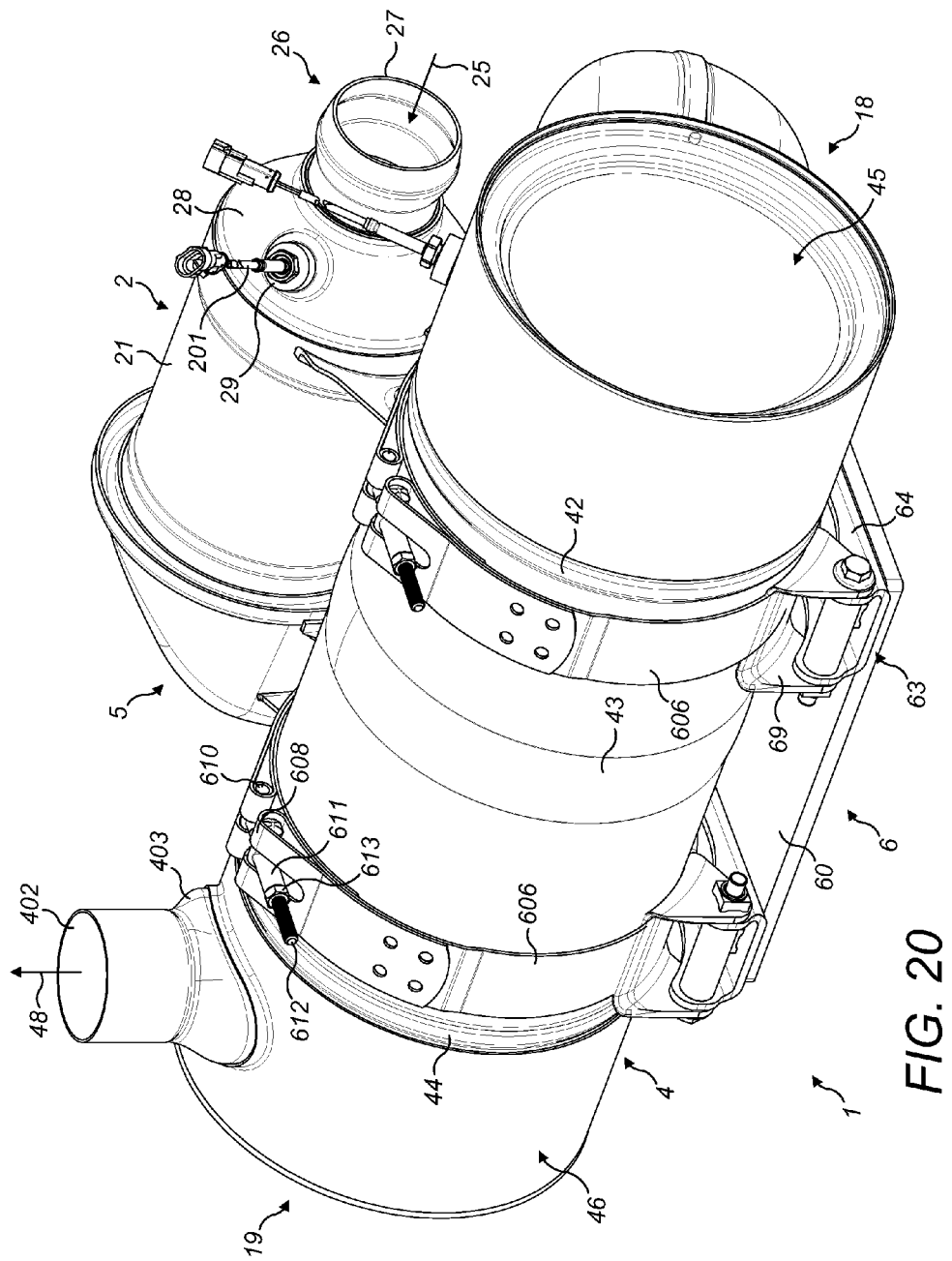
FIG. 20 shows a perspective view of a second embodiment of emissions cleaning module without heat shields mounted thereto.
Figure 21:
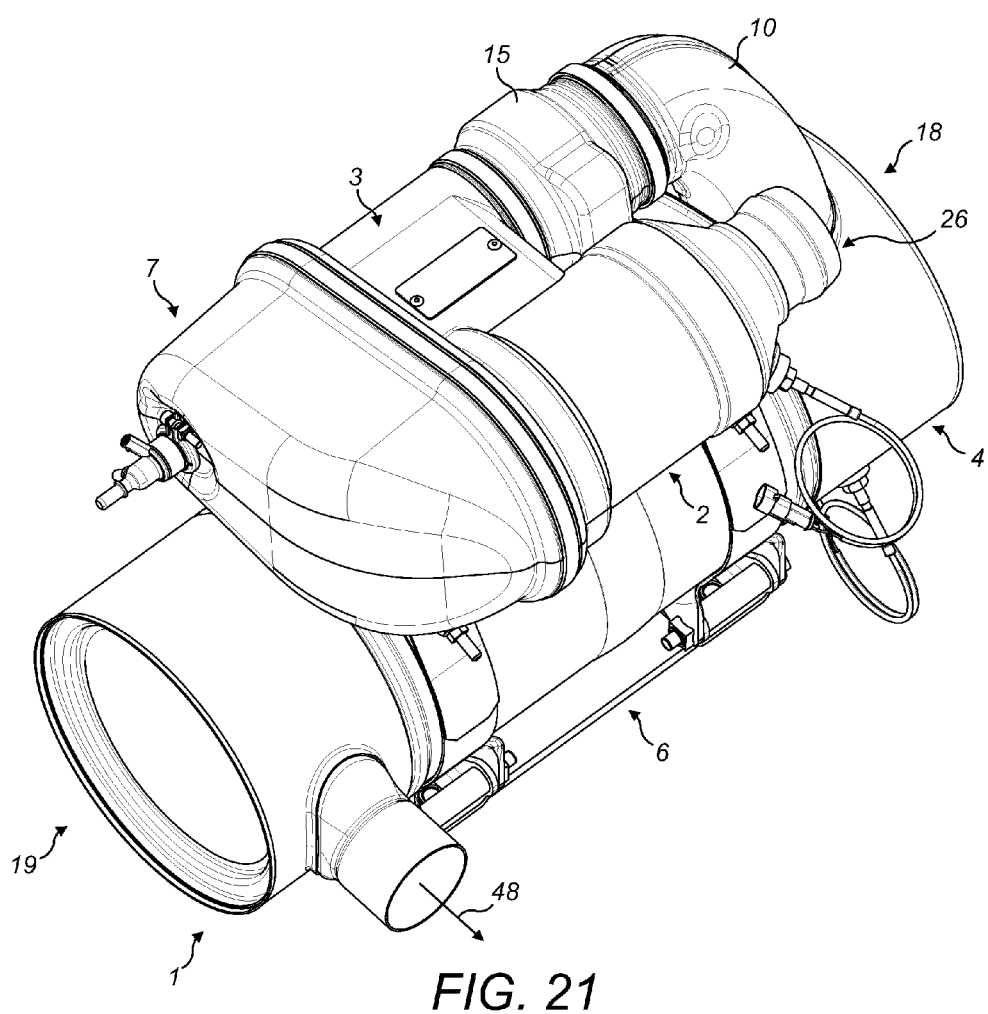
FIG. 21 shows a perspective view of the emissions cleaning module of FIG. 20 from another angle and with heat shields mounted thereto.

As shown in FIG. 19, the mounting plate 60 may be provided with bolt holes 62 for receiving fastening means such as bolts for fastening each mounting saddle 63 to the mounting plate 60. In addition, the mounting plate 60 may be provided with bolt holes 61 for receiving fastening means such as bolts for mounting the mounting plate 60 to the external support. Where the mounting plate 60 is omitted, the fastening means such as bolts may fasten each mounting saddle 63 directly to the external support or mount, for example using bolt holes provided in the chassis.

FIGS. 20 to 27 show a second embodiment of an emissions cleaning module 1 according to the present disclosure. As noted above, certain features and components of the first embodiment may be present in the second embodiment. In the following description only the differences between the first and second embodiments will be described. In other respects the second embodiment is as described in the first embodiment. For example, the second embodiment may also comprise a mixing element 33, a flowhood 5, a heat shield 7 and a clamp heat shield 15 as described above.

In the second embodiment the first conduit 2 may be shorter than in the first embodiment. In particular, the cylindrical body 21 of the second conduit may be shorter than in the first embodiment. The DOC module contained in the cylindrical body 21 may only comprise a single DOC element. The single DOC element may be longer than the first DOC element 203 or the second DOC element 204 taken individually but may be shorter than the aggregate length of the first DOC element 203 and the second DOC element 204. The second conduit 4 which may contain the SCR module may have a smaller diameter than the second conduit 4 of the first embodiment.

Figure 27:
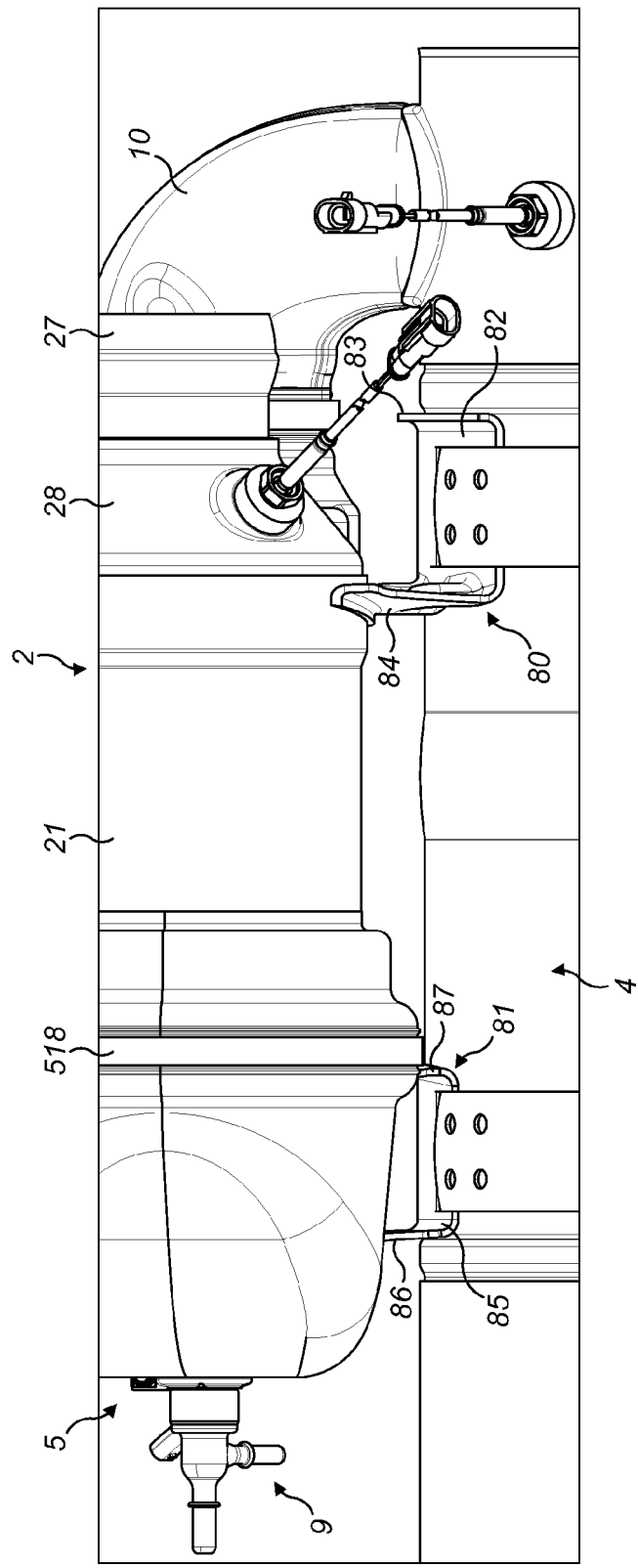
FIG. 27 shows a side view of a portion of the emissions cleaning module of FIG. 20.

As shown in FIG. 27, the mounting of the first conduit 2 to the second conduit 4 may be slightly altered. In particular, the orientation of the first leg 80 may be reversed such that the flange 84 is located towards the second end 19 of the emissions cleaning module 1. This change may accommodate the shorter length of the first conduit 2 by reducing the distance between the mounting points of the first conduit 2 compared to the first embodiment.

In other respects the second embodiment is structured, assembled and operated as described above with reference to the first embodiment.

Figure 28:
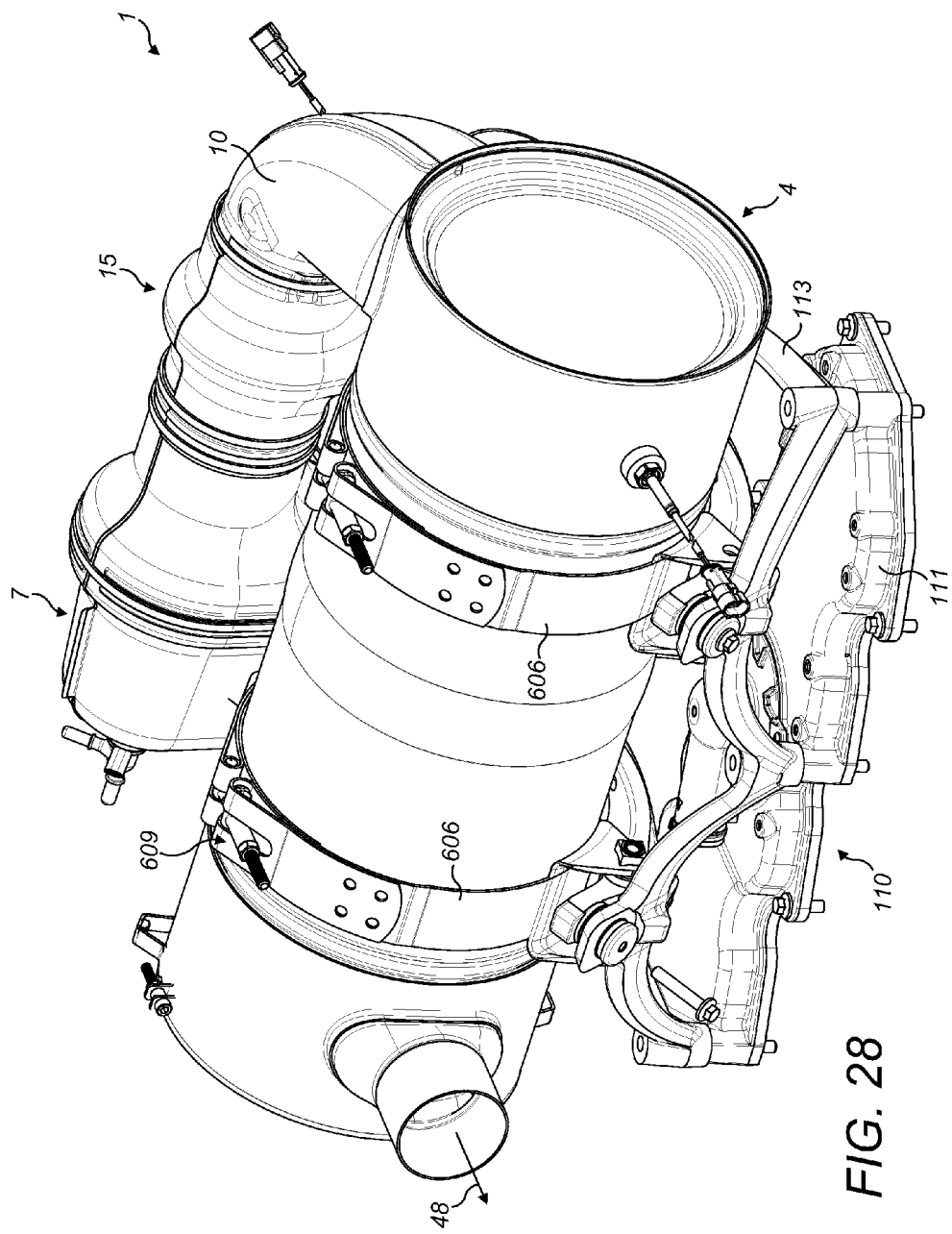
FIG. 28 shows a perspective view of a third embodiment of emissions cleaning module with heat shields mounted thereto.
Figure 29:
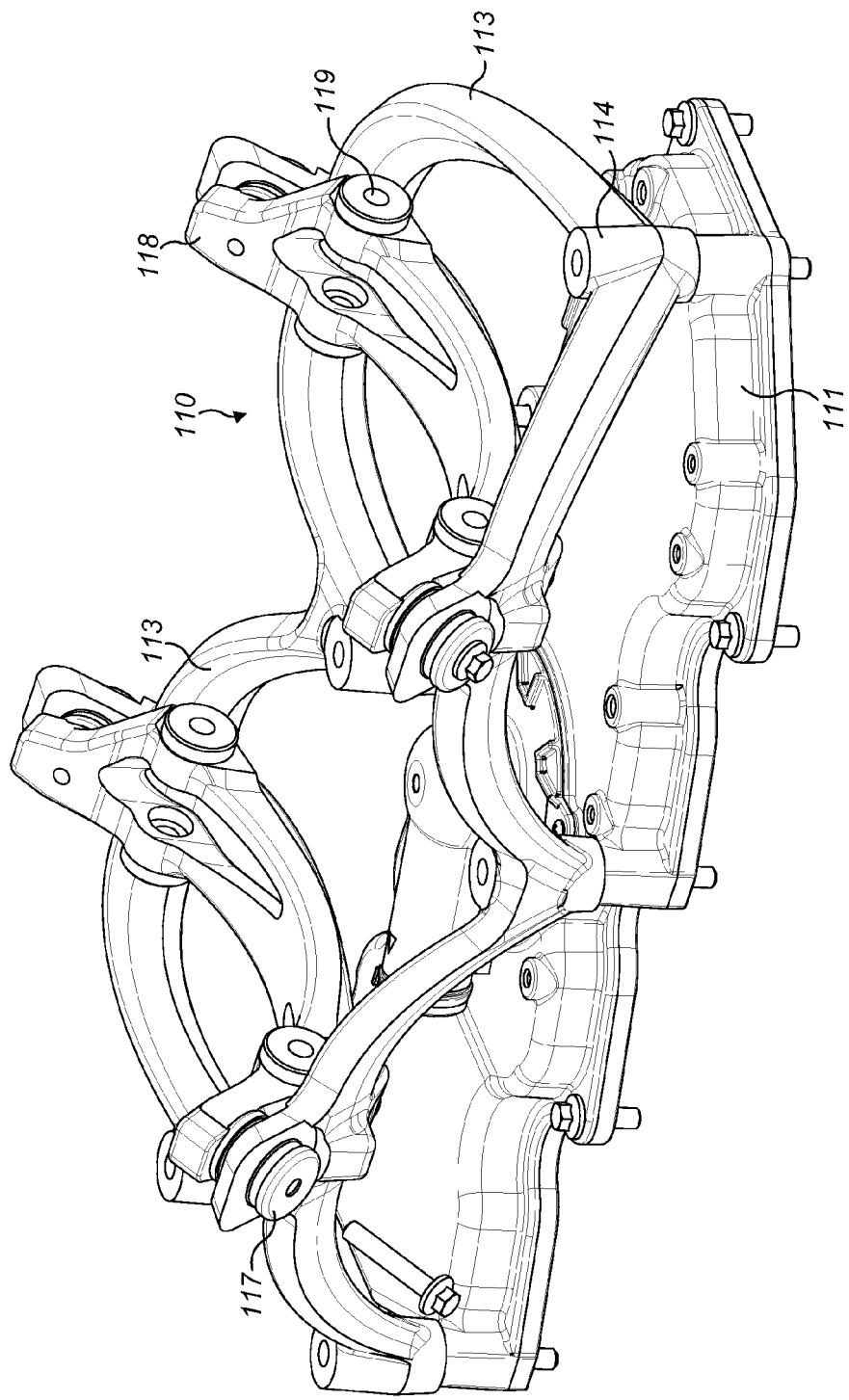
FIG. 29 shows a perspective view of a mounting mechanism of the emissions cleaning module of FIG. 28.
Figure 30:
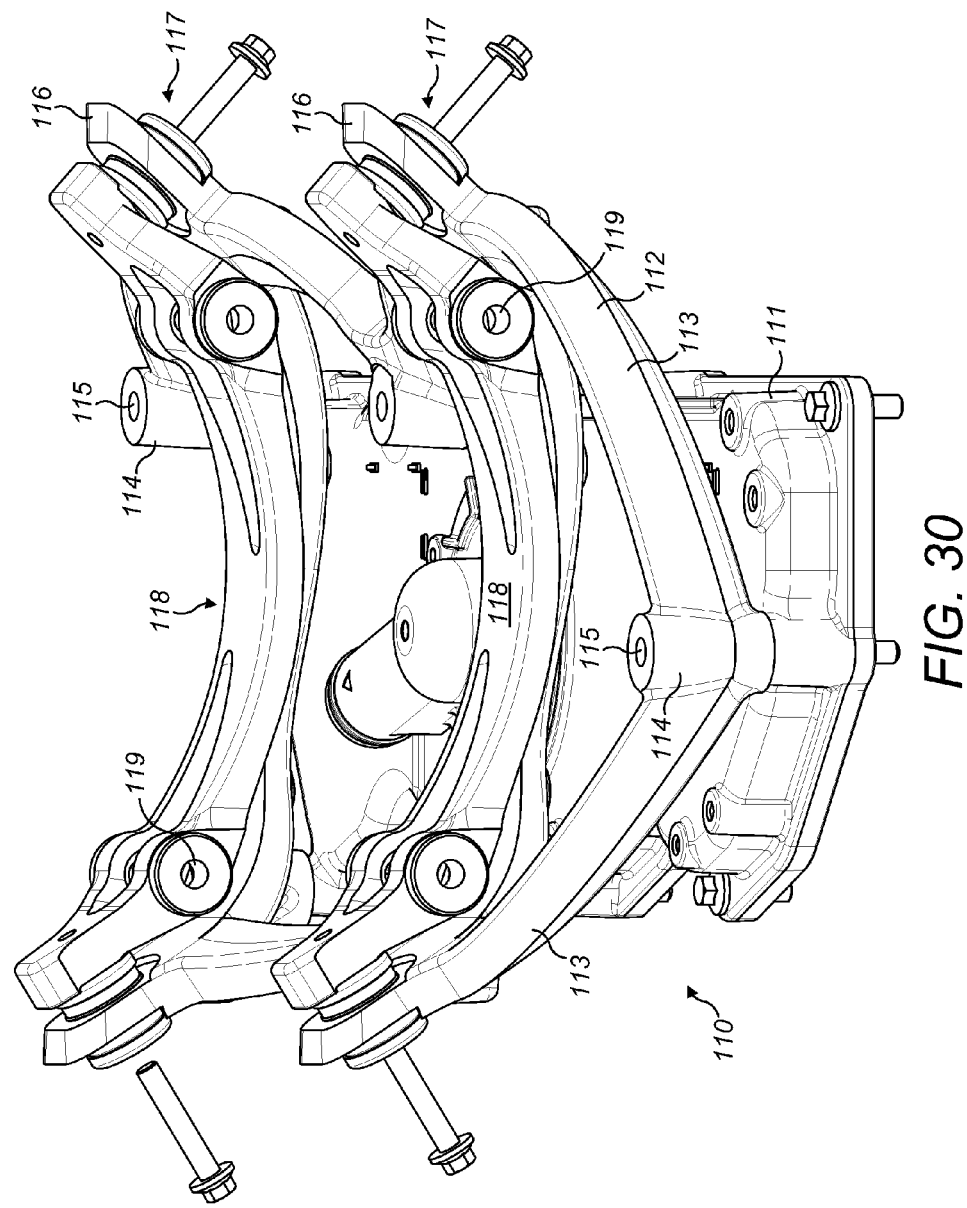
FIG. 30 shows a perspective view of the mounting mechanism of FIG. 29 from another angle.

FIGS. 28 to 30 show a third embodiment of emissions cleaning module 1 illustrating a second mounting mechanism 110 which may be used in place of the first mounting mechanism 6. The second mounting mechanism 110 may be used with either the first or second embodiment of emissions cleaning module 1.

The second mounting mechanism 110 may be configured to mount the second conduit 4 directly to an element of an engine from which the exhaust gases requiring treatment are to be derived. For example, as illustrated, the mounting may be direct to a rocker cover 111 of the engine.

As shown in FIG. 29, the second mounting mechanism 110 comprises a support structure having a lower section adapted to be mounted to the engine and an upper section, coupled to the lower section, and adapted to carry the emissions cleaning module. The lower section may comprise a mounting frame 112. The upper section may comprise a plurality of mounting saddles. Each mounting saddle may comprise a lower element in the form of a mounting cradle 118 as shown in FIG. 29, and an upper element 69 which may be of the same type as described above with reference to the first mounting mechanism 6. In particular, the upper element 69 may be flexible as described above to be able to conform substantially to the curvature of the second conduit 4 when strapped thereto.

The mounting frame 112 may comprise a plurality of support arms 113. The support arms 113 may extend upwardly and outwardly from mounting bases 114. Each mounting base 114 may have two support arms 113 extending therefrom. The support arms 113 may be arcuate. Each support arm 113 may extend between two mounting bases 114. Each mounting base 114 may comprises a vertically-orientated pillar although the orientation of the pillar may be adapted according to the mounting surface to which it is to be connected. Each mounting base 114 may be provided with a through aperture to allow a fastening bolt to extend therethrough (not shown). The fastening bolts may be used to secure the mounting frame 112 to the rocker cover 111. The same fastening bolts may also be used to secure the rocker cover 111 to another element of the engine.

The support arms 113 may be provided with a plurality of mounting points 116. Two pairs of mounting points 116 may be provided and they may be located substantially midway between the two mounting bases 114. A mounting cradle 118 may be provided extending between each pair of mounting points 116. The mounting cradle 118 may be mounted to the mounting points 116 using an anti-vibration mount 117. Each anti-vibration mount 117 may be of chlorobutyl rubber. Two mounting cradles 118 may be provided.

The upper element 69 of each mounting saddle may comprise an arcuate body and may have an upper surface shaped to conform to the cylindrical body 41 of the second conduit 4. Two pairs of holes 119 may be provided in each mounting cradle 118 to allow coupling of the upper element 69 to the mounting cradle 118 by means of bolts as described above with reference to the first mounting mechanism 6.

As shown in FIG. 28, the second mounting mechanism 110 also comprise straps 606 which may be of the same type as described above with reference to the first embodiment.

In order to mount the second conduit 4 to the mounting frame 112, the upper elements 69 are strapped to the cylindrical body 41 as described above with the straps 606 being secured by adjustable clamps 609. The upper elements 69 are then connected to the mounting cradles 118 by means of the bolts which pass through the holes 68 of the upper elements 69 and the holes 119 of the mounting cradles 118.

Thus, the second conduit 4 may be mounted directly to an engine using the second mounting mechanism. The anti-vibration mounts 117 may function to reduce vibration of the second conduit 4 that might be induced by operation of the engine. Other components of the second mounting mechanism (and indeed the first mounting mechanism) may be of grey cast iron. As with the first embodiment, the first conduit 2 is mounted to, and supported by, the second conduit 4.

Figure 31:
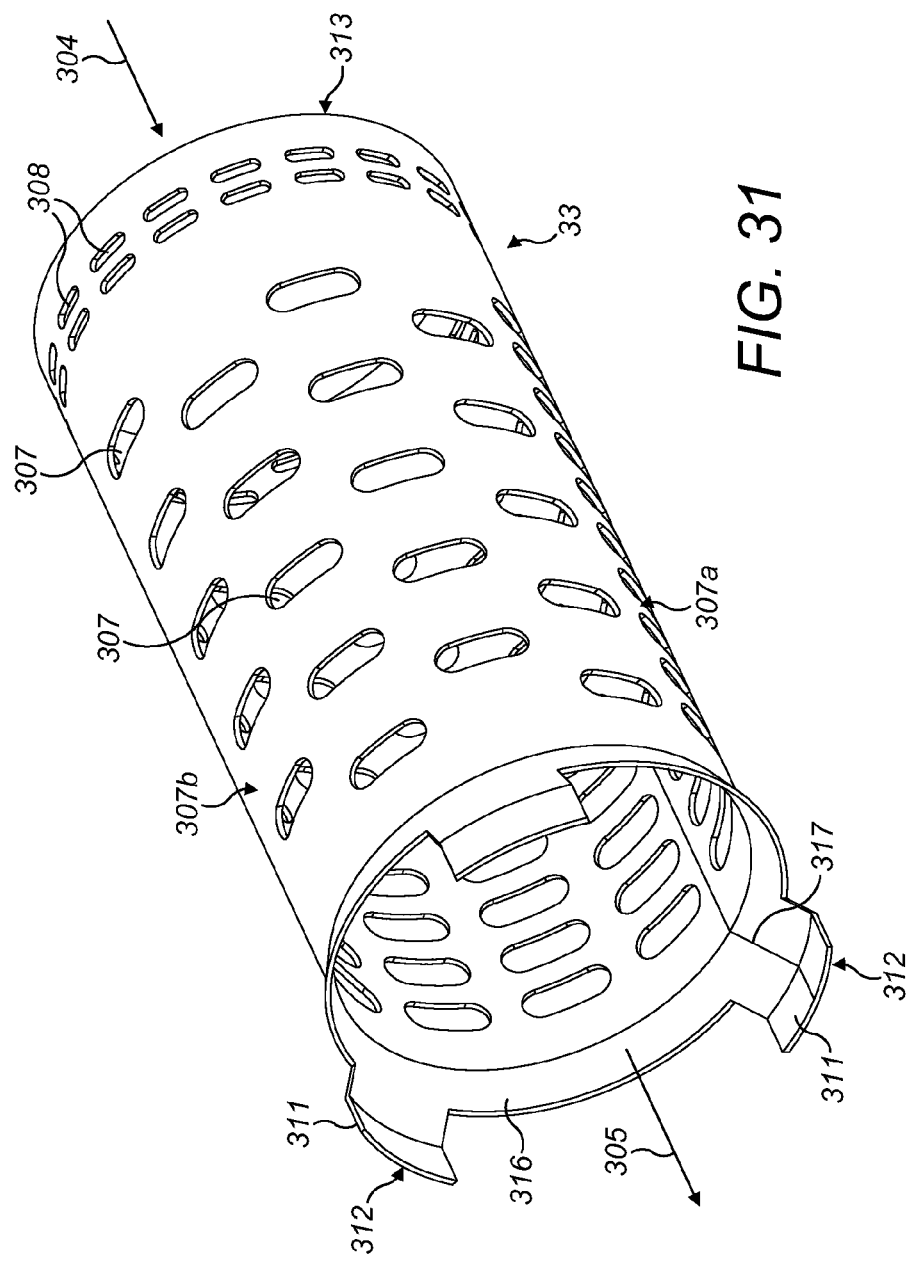
FIG. 31 shows a perspective view of an alternative mixing element for use in the emissions cleaning module of FIG. 1.
Figure 32:
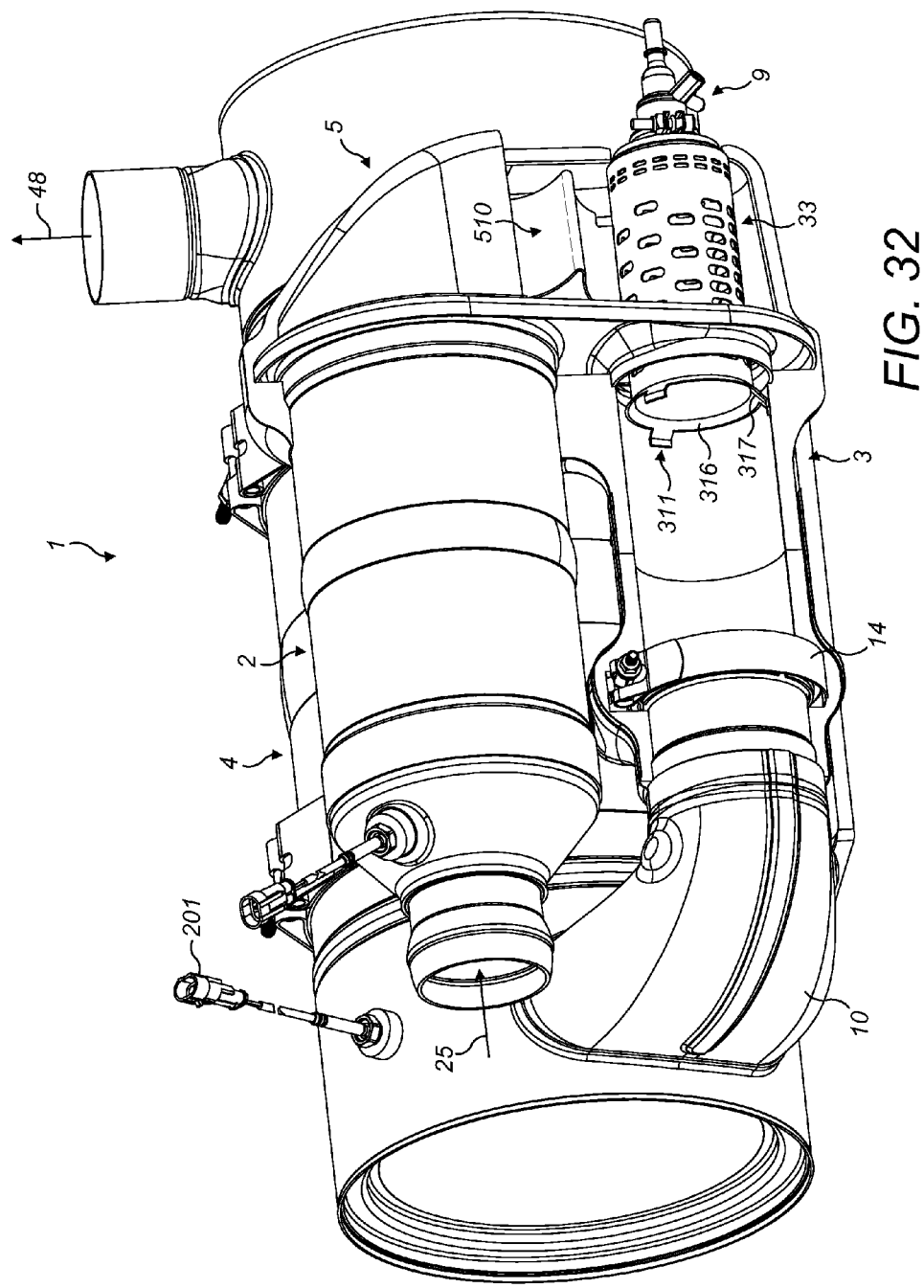
FIG. 32 shows the alternative mixing element of FIG. 31 assembled in the emissions cleaning module of FIG. 1 with certain parts omitted for clarity.

FIGS. 31 and 32 show an alternative version of the mixing element 33 which may be used in place of the mixing element described previously. This version of the mixing element 33 may, for example, be used with either the first or second embodiment of emissions cleaning module 1 described above. In the following, only the differences between this version of the mixing element 33 and that previously described will be discussed.

As previously, the mixing element 33 may be provided to extend within both the flowhood 5 and the third conduit 3. In this version, as shown in FIG. 32, the length of the mixing element 33 may be reduced so that the downstream end of the mixing element 33 only projects a short way into the third conduit 3. Thus, a majority of a length of the elongate body 306 of the mixing element 33 may be located within the flowhood 5 and a minority of the length of the elongate body 306 of the mixing element 33 may be located in the downstream, third conduit 3. As an extreme example, only the flared leg supports 311 may extend into the downstream, third conduit 3 and may be welded thereto. Reducing the length of the mixing element 33 may help to reduce the number of available sites for deposit of urea or ammonia during use.

In the alternative version of the mixing element 33, as shown in FIG. 31, the six flared leg supports 311 are replaced with three leg supports 311 which may project from a circumferential flared rim 316 which may extend outwardly from a main part of the elongate body 306. As in the first version of mixing element 33, gaps may be provided between adjacent flared leg supports 311. The circumferential flared rim 316 may be continuous around the circumference of the elongate body 306. As before, the leg supports 311 may act, on assembly, to maintain the mixing element 33 in spaced relationship with the cylindrical body 31 such that a longitudinal axis of the elongate body 306 is parallel to the longitudinal axis 30 of the third conduit 3. As shown in FIG. 32, the circumferential flared rim 316 extends part way from the main part of the elongate body 306 to the wall of the third conduit 3 and the leg supports 311 bridge the remaining gap and may then be affixed to the wall for example by welding. Thus the leg supports 311 are shorter in length than in the embodiment of mixing element 33 shown in FIG. 13.

The mixing element 33 may be formed as a unitary piece. In particular, the flared leg supports 311 and the circumferential flared rim 316 may be formed as a single piece with the main part of the elongate body 306.

The mixing element 33 may be formed from a single blank of a suitable material, for example stainless steel, which is formed by bending into a cylindrical shape with a longitudinal seam 317 being secured by welding. As noted above, the leg supports 311 and circumferential flared rim 316 may be formed in one piece with a remainder of the mixing element 33. The plurality of apertures 307 may be stamped and/or laser cut in the blank material before forming the elongate body 306.

Alternatively, the mixing element 33 (of this or the previous version) may be formed from a pre-formed tube of a suitable material such as stainless steel. The leg supports 311 and circumferential flared rim 316 (where present) may then be formed by a suitable combination of cutting, stamping and deformation of the pre-formed tube. The plurality of apertures 307 may be formed, for example, by stamping. Advantageously, forming the mixing element 33 from a pre-formed tube may allow for easier formation of an elongate body 306 which is more accurately circular in cross-section since the need to roll and weld the blank is avoided.

The plurality of apertures 307 may comprise two or more zones 307*a*, 307*b* of apertures, as shown in FIG. 31, which may be arranged circumferentially around the elongate body 306. A first zone 307*a* of apertures may comprise a greater density of apertures 307 than a second zone 307*b* of apertures 307. The first and second zones 307*a*, 307*b* of apertures 307 may each extend approximately around one-half of a circumference of the elongate body 306. Alternatively, the first and second zones 307*a*, 307*b* may occupy different amounts of the surface area of the elongate body 306. For example, in the illustrated example, the first zone of apertures 307*a* extends around 240° of the circumference and the second zone of apertures 307*b* extends around 120° of the circumference.

FIG. 32 illustrates the mixing element 33 in position within the emissions cleaning module 1. The elongate body 306 may be orientated such that the longitudinal seam 317 is located at a 'lowermost' position (in the orientation as viewed in FIG. 32) such that the longitudinal seam 317 is furthest away from the incoming flow of exhaust gas.

The second zone 307*b* of apertures may be located on the elongate body 306 so that it is generally facing the incoming flow of exhaust gas from the flowhood 5. As shown in FIG. 31, the flowhood 5 may optionally be provided with a deflector 510 of a type that will be described further below with reference to FIGS. 33 and 34. The effect of the deflector 510 will be to direct the flow of exhaust gas into a swirling, cyclonic motion that will have at least a proportion of the flow of exhaust gas reaching the mixing element 33 in a direction to flow over and around at least a part of the circumference of the mixing element 33, rather than initial impacting the mixing element in a perpendicular orientation. Thus, the effect of the deflector 510 may be to reduce the amount of the exhaust gas which directly jets into the interior of the mixing element 33 since at least a proportion of the exhaust gas is, instead, encouraged to swirl around the outside of the mixing element before potentially entering the mixing element 33. Portions of the exhaust gas may circulate around the mixing element 33 a number of times before entering the interior of the mixing element. As shown in FIG. 32, the mixing element 33 may be orientated so that the second zone of apertures 307b is first contacted by the deflected flow of exhaust gas.

The first zone 307a of apertures may be located on the opposite side of the elongate body 306 from the second zone 307b. In other words, the first zone 307a of apertures 307 may be located on the elongate body 306 generally facing away from the incoming flow of exhaust gas.

The apertures 307 in the first zone 307a may be arranged in a regular 'rectangular' array wherein each row of apertures contains the same number of apertures and the apertures in all rows align with each other. In the illustrated example, the array comprises six longitudinal rows each containing ten apertures.

The apertures 307 in the second zone 307b may be arranged in a regular 'staggered' array created by taking the 'rectangular' array of the first zone 307a and omitting every other aperture in each row and by aligning the apertures 307 in the first, third, fifth rows, etc, and aligning the apertures in the second, fourth, sixth rows, etc. An example of such arrangements is shown in FIG. 31. In this example, the array comprises four longitudinal rows each containing five apertures.

The apertures 307 in the first zone 307a may alternatively be arranged in a regular 'staggered' array similar to that of the second zone 307b rather than a regular 'rectangular' array as shown in FIG. 31 but could still have an aperture density that was greater than in the second zone 307b by locating the apertures 307 in the first zone 307a closer together or enlarging the size of each aperture 307.

Figure 33:
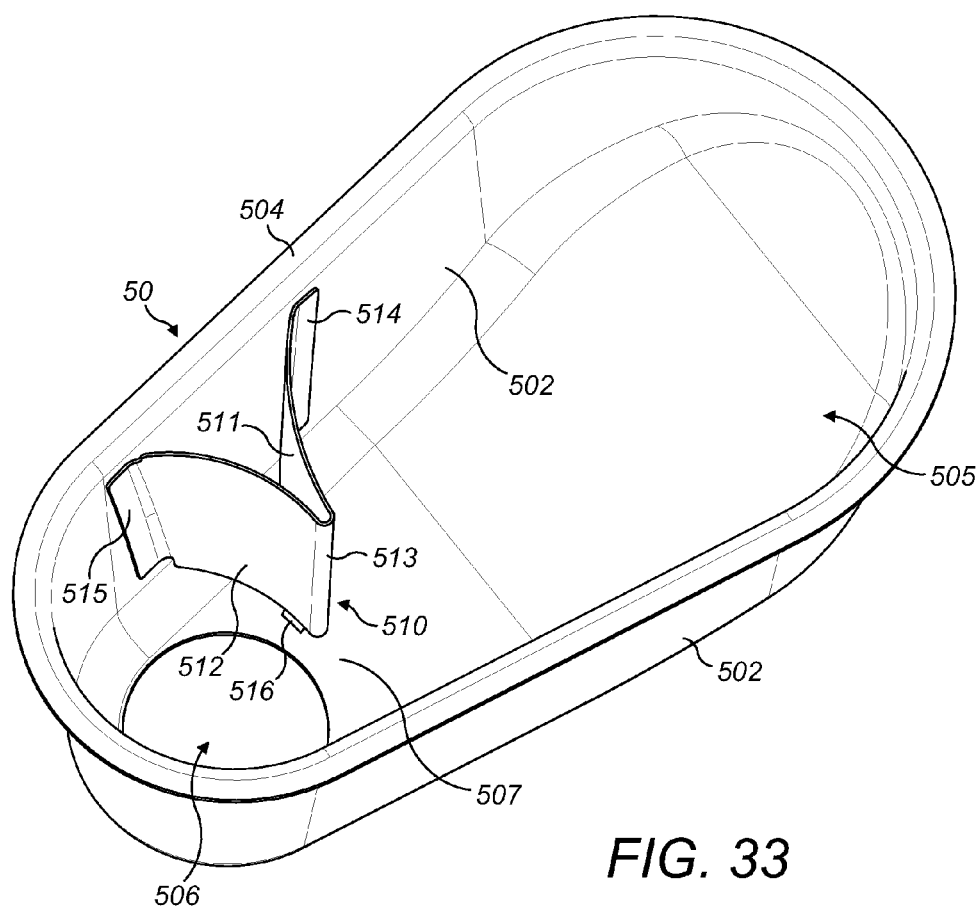
FIG. 33 shows a perspective view of a portion of a first alternative flowhood.
Figure 34:
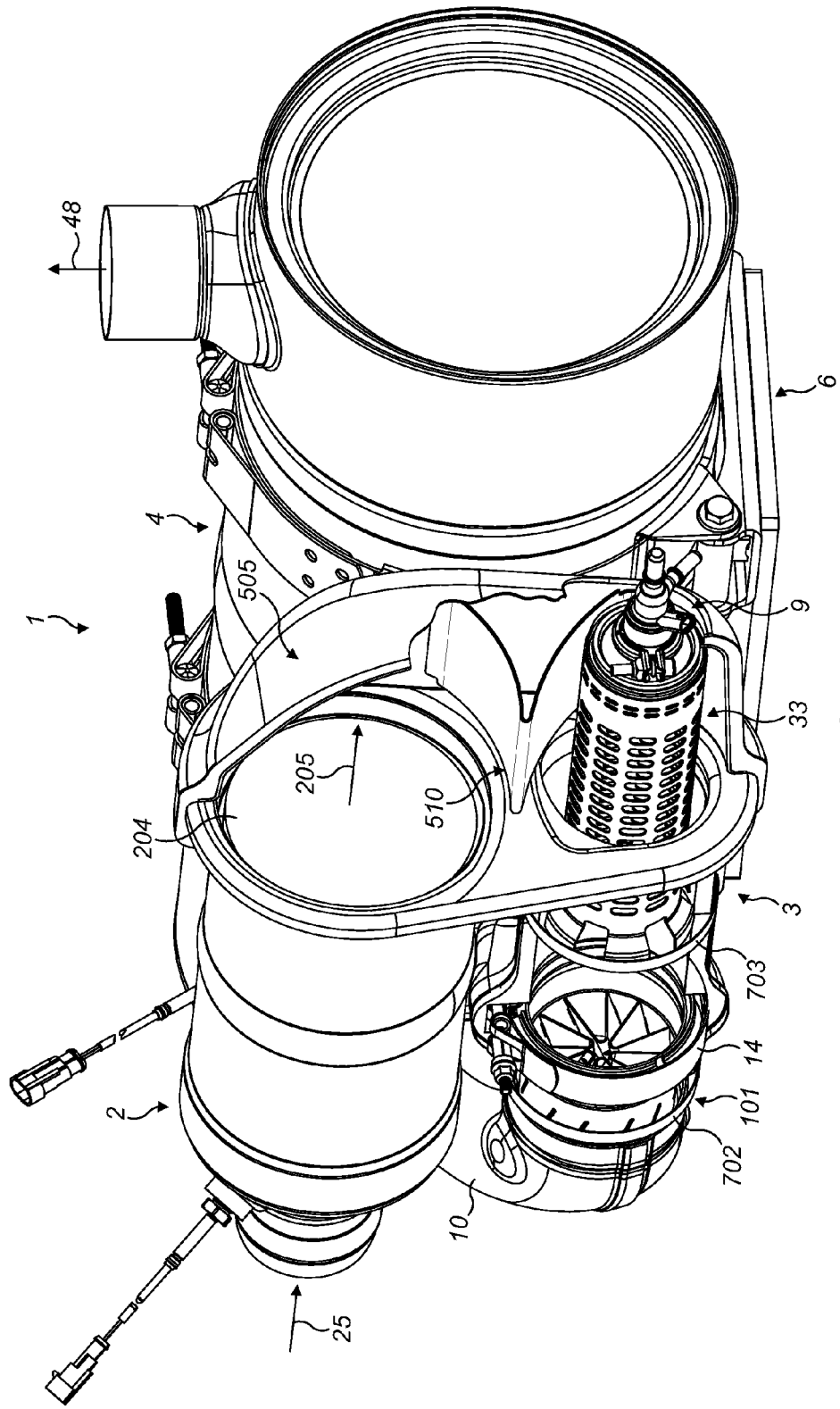
FIG. 34 shows the first alternative flowhood of FIG. 33 assembled in the emissions cleaning module of FIG. 15.

FIGS. 33 and 34 show a first alternative version of the flowhood 5 which may be used in place of the flowhood described previously. This version of the flowhood 5 may, for example, be used with either the first or second embodiment of emissions cleaning module 1 described above. In the following only the differences between this version of the flowhood 5 and that previously described will be discussed.

In this first alternative version the flowhood 5 may be provided with a deflector 510 as mentioned previously when discussing FIG. 32. The deflector 510 may comprise a generally V-shaped configuration having a first element 511 and a second element 512 joined at an apex 513. The first element 511 and/or the second element 512 may have a concavely curved external face. The first element 511 may have a first mounting flange 514 at its distal end. The second element 512 may have a second mounting flange 515 at its distal end. As shown in FIG. 33, the deflector 510 may be mounted by the flanges 514 and 515 to an inner face of the side wall 502, for example by welds between the first mounting flange 514 and the second mounting flange 515 and the side wall 502. An additional welding point 516 may be provided nearer to the apex 513 of the deflector 510 joining the deflector 510 to the inner face of the rear wall 507. If desired, the deflector 510 may comprise an additional element (not shown) extending between the mounting flanges 514 and 515 to form a triangular configuration of the deflector 510. This additional element may also be welded to the flowhood 5.

The deflector 510 may be located towards the end of the flowhood 5 nearest the aperture 506. As shown in FIG. 34, once assembled, the curvature of the second element 512 may substantially follow the curvature of the mixing element 33 whilst being spaced therefrom in order that at least part of the second element 512 is concentrically arranged relative to the mixing element 33 to so define a part-annular void space between the deflector 510 and the mixing element 33. It will be understood by use of the term "concentrically arranged" it is not meant that all portions of the second element 512 need be equidistant from the mixing element 33. Instead, it is meant that the second element 512 of the deflector 510 is physically spaced from the mixing element 33 and shaped such that the flow of exhaust gas passing the deflector 510 is diverted into a swirling motion around the circumference of the mixing element 33 and that the part-annular void space between the second element 512 and the mixing element 33 allows the exhaust gas to swirl around the mixing element 33 potentially for a plurality of revolutions before potentially entering the interior of the elongate body 306 through the apertures 307.

Figure 35:
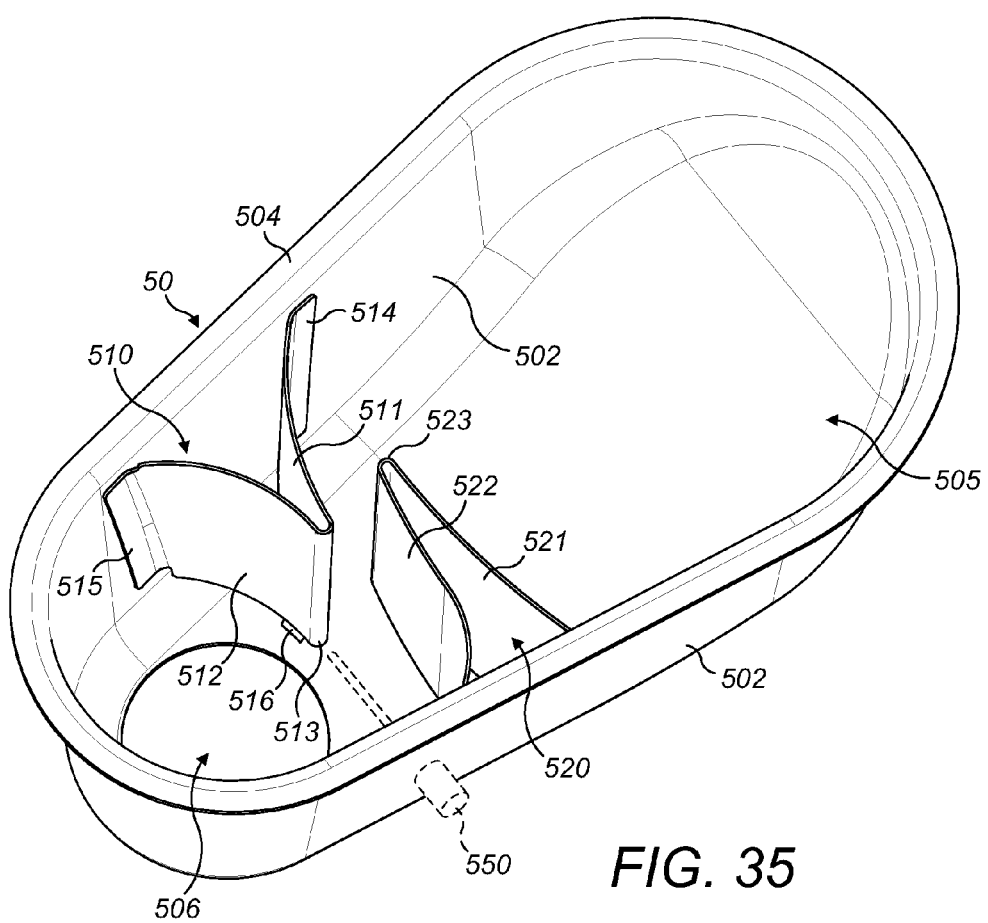
FIG. 35 shows a perspective view of a portion of a second alternative flowhood.
Figure 36:
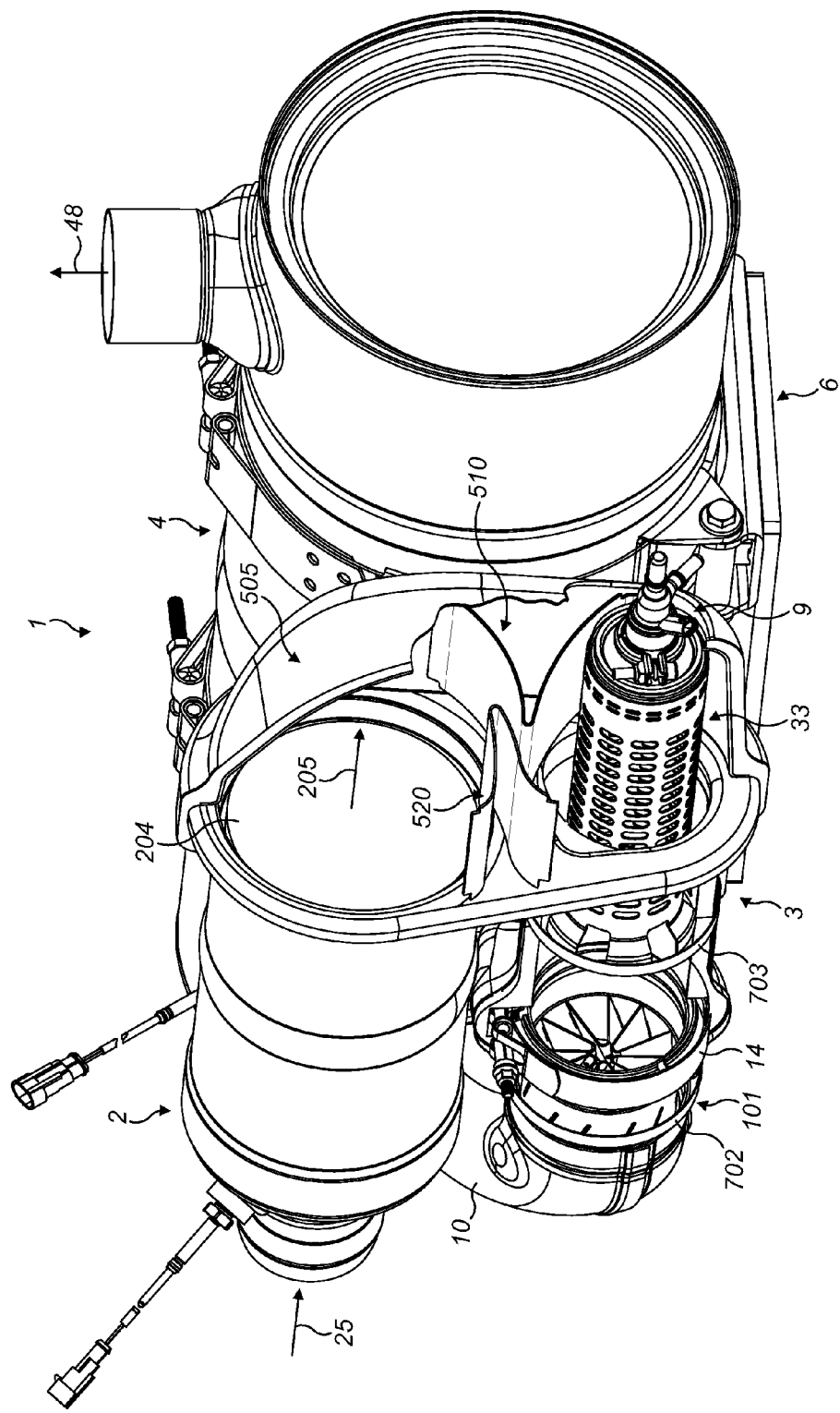
FIG. 36 shows the second alternative flowhood of FIG. 35 assembled in the emissions cleaning module of FIG. 15.

FIGS. 35 and 36 show a second alternative version of the flowhood 5 which may be used in place of the flowhoods described previously. This version of the flowhood 5 may, for example, be used with either the first or second embodiment of emissions cleaning module 1 described above. In the following only the differences between this version of the flowhood 5 and that previously described will be discussed.

In this second alternative version of the flowhood 5 a first deflector 510 may be provided as described immediately above. In addition a second deflector 520 may be provided which may be mounted to the side wall opposite the first deflector 510. The second deflector 520 may have the same general form as the first deflector 510, namely a generally V-shaped configuration having a first element 521 and a second element 522 joined at an apex 523. The first element 521 and/or the second element 522 may have a concavely or otherwise curved external face. The first element 521 may have a first mounting flange at its distal end. The second element 522 may have a second mounting flange at its distal end.

As shown in FIG. 35, the second deflector 520 may be mounted by the flanges to an inner face of the side wall opposite the first deflector 510, for example by welds between the first mounting flange and the second mounting flange and the side wall. An additional welding point may be provided nearer to the apex of the second deflector 520 joining the second deflector 520 to the inner face of the rear wall 507. If desired, the second deflector 520 may comprise an additional element (not shown) extending between the mounting flanges to form a triangular configuration of the second deflector 520. This additional element may also be welded to the flowhood 5.

The second deflector 520 may be located just upstream of the first deflector 510 so as to define a tortuous path between the second deflector 520 and the first deflector 510. The dimensions of the tortuous path can be adjusted by adjusting the positioning of the first and/or second deflector 510, 520. The flowhood 5 may be provided with a NOx sensor. This may, for example, be the case where the flowhoods 5 of the present disclosure are utilised in an emissions cleaning module 1 having a diesel particulate filter (DPF). The NOx sensor may be mounted, for example, as shown in dotted lines in FIG. 35 and indicated by reference numeral 550. The NOx sensor 550 may be mounted through an aperture in the sidewall 502 and orientated perpendicularly thereto. The sensing tip of the NOx sensor 550 may be located downstream of the second deflector 520 and may be generally aligned with the location of the apex 513 of the first deflector 510 but spaced therefrom.

INDUSTRIAL APPLICABILITY

In use, the emissions cleaning module 1 may be mounted to a chassis, or similar external support, by use of the first or second mounting mechanisms 6 and 110. A conduit originating from a source of exhaust gas, for example a diesel combustion engine, may be connected to the cylindrical mounting pipe 27 of the first conduit 2. A section of external pipe work forming a portion of an exhaust arrangement may be connected to the cylindrical mounting pipe 402 of the second conduit 4.

During operation exhaust gas may be supplied to the first conduit 2 of the emissions cleaning module 1 via the inlet 25. The exhaust gas may, if desired, be a fluid that has been configured to contain a low proportion of carbon (C) in the form of soot. This may be achieved, for example, by suitable control of the ignition parameters within the cylinders of an internal combustion engine from which the exhaust gas may be derived. This may avoid the need to include a diesel particulate filter device as part of the emissions cleaning module 1. Prior to receipt at the inlet 25, the temperature of the exhaust gas may be controlled by a back pressure valve.

The temperature of the incoming exhaust gas may be sensed as it passes through the inlet connector 26 by the temperature sensor 29 and the information transmitted to the engine control module.

The exhaust gas may then pass into the DOC module 202 in the first conduit 2. The DOC module 202 may function to cause oxidation of hydrocarbons ([HC]) and carbon monoxide (CO) present in the exhaust gas to produce carbon dioxide ($CO_2$) and water ($H_2O$).

The exhaust gas may then pass through the outlet 205 of the first conduit 2 into the flowhood 5 via the inlet 52. The exhaust gas may then be channeled by the rounded portion 505 of the body 58 of the flowhood 5 around towards the inlet 35 of the third conduit 3. The flow of exhaust gas may circulate around the elongate body 306 of the mixing element 33 whereby at least a proportion of the exhaust gas may pass into an interior of the elongate body 306 via the apertures 307. Due to the closure of the first end 304 of the elongate body by mounting the rim 313 to the inner face 507 no exhaust gas can enter the interior of the elongate body 306 via the first end 304 but only through the apertures 307 and, in addition, a portion of the exhaust gas may also pass into the interior of the elongate body 306 via the scavenging holes 308. Thus, all of the exhaust gas entering the interior of the elongate body 306 does so by passing through apertures in the circumferential wall of the mixing element 33. A portion of the exhaust gas may also bypass the mixing element 33 and reach the downstream end of the third conduit 3 without entering the interior of the elongate body 306 by passing through the gaps between the flared support legs 311.

A reductant fluid, such as urea or ammonia, may be injected by the injector module 9 into the first end 304 of the mixing element 33 and thus into the flow of exhaust gas. The patterns of fluid flow which may be induced in the exhaust gas by the mixing element 33 may promote mixing of the injected fluid with the exhaust gas. Such mixing may promote heat transfer from the relatively hot exhaust gas to the injected fluid which may promote conversion of the urea, where used, to ammonia. Such mixing may also produce a more uniform mixture of the injected fluid within the exhaust gas. The portion of the exhaust gas passing through the scavenging holes 308 may flow over or in close proximity to the outlet of the injector module 9 and may thus function to help prevent build-up of deposits of the injected fluid on or near the outlet of the injector module 9.

The mixture of the exhaust gas and the injected fluid may then pass along the third conduit 3 and via the swirl unit 101, where present. The angling of the blades 103 of the swirl unit 101 may induce a swirling motion into the flow of fluid, which may promote greater uniformity in concentration of the injected fluid within the exhaust gas. The swirl unit 101 is an optional component.

Fluid may then pass via the flow connector 10 into the second conduit 4 and through the SCR module contained therein. The temperature of the fluid entering the second conduit 4 may be sensed by the temperature sensor 49 and the information transmitted to the engine control module.

As the fluid passes over the surfaces of the catalyst within the SCR module a reaction may occur which converts the ammonia and NOx to diatomic nitrogen ($N_2$) and water ($H_2O$).

Fluid may then pass from the SCR module to the AMOX module, where present, located further downstream in the second conduit 4. The AMOX module may function to cause any residual ammonia present in the exhaust gas to react to produce nitrogen ($N_2$) and water ($H_2O$).

From the AMOX module the fluid may pass out of the outlet 48 and into the external pipework.

Where the alternative version of the mixing element 33 is used, the operation of the emissions cleaning module 1 may be modified to the extent that the different arrangements of apertures 307 in the first and second zones 307a, 307b (and optionally the deflector 510 as well) encourages a swirling, cyclonic flow of exhaust gas around the elongate body 306 at the same time as exhaust gas passes into the interior of the elongate body 306 via the apertures 307. This is due to the reduced number of apertures 307 in the second zone 307b having the effect that a greater proportion of the exhaust gas will pass around the elongate body 306 and in through the apertures 307 of the first zone 307a than in the first version of mixing element described previously.

The reduced number of flared support legs 311 (three rather than the six of the first version) has the effect of reducing the impediment to flow along the third conduit 3 of any exhaust gas that does not pass through the apertures 307. The provision of the circumferential flared rim 316 permits the amount of exhaust gas that passes through the apertures 307 compared to the amount of gas that passes along the third conduit 3 outside of the mixing element 33 to be controlled. For example, by increasing the diameter of the circumferential flared rim 316 (and thus reducing the clearance with the inner face of the third conduit 3) a greater proportion of the exhaust gas can be forced to flow through the apertures 307, and vice versa.

The shorter length of the mixing element 33 may be advantageous in certain circumstances by allowing a larger void space within the third conduit 3 downstream of the elongate body 306 for completion of the mixing of the injected and exhaust fluids and the heat transfer from the relatively hot exhaust gas to the injected fluid.

Where the first alternative version of the flowhood 5 of FIG. 33 is used, the operation of the emissions cleaning module 1 may be modified to the extent that prior to reaching the inlet 35 of the mixing chamber 32 the exhaust fluid may be deflected by the deflector 510 such that a swirling, cyclonic motion is induced into the flow of exhaust fluid. In particular, as shown in FIG. 34, the spacing and mutual orientation of the deflector 510 and the mixing element 33 may be configured such that at least a proportion of the flow of exhaust gas reaching the mixing element 33 is directed to flow over and around at least a part of the circumference of the mixing element 33, rather than initial impacting the mixing element in a perpendicular orientation. Thus, the flow of exhaust gas passing the deflector 510 may be diverted into a swirling motion around the circumference of the mixing element 33. The part-annular void space between the second element 512 and the mixing element 33 may allow the exhaust gas to swirl around the mixing element 33 potentially for a plurality of revolutions before potentially entering the interior of the elongate body 306 through the apertures 307. This configuration of deflector 510 and mixing element 33 may help to enhance the passage of at least a proportion of the exhaust fluid into an interior of the elongate body 306 via the apertures 307. In particular, the swirling, cyclonic motion may help to prevent the clogging of flow on the mixing element 33. The use of the deflector 510 may also be used to control the velocity of the flow of exhaust fluid by controlling the gap between the apex 513 of the deflector 510 and the opposite side wall 502.

In addition, the patterns of fluid flow which may be induced in the exhaust fluid by the deflector 510 may promote mixing of the injected fluid with the exhaust fluid. Such mixing may promote heat transfer from the relatively hot exhaust fluid to the injected fluid which may promote conversion of the urea, where used, to ammonia. Such mixing may also produce a more uniform concentration of the injected fluid within the exhaust fluid.

Where the second alternative version of the flowhood 5 of FIG. 35 is used, the operation of the emissions cleaning module 1 may be modified to the extent that prior to reaching the inlet 35 of the mixing chamber 32 the exhaust fluid may be deflected by the first deflector 510 and the second deflector 520. As with use of just the first deflector 510 this may cause a swirling, cyclonic motion to be induced into the flow of exhaust fluid which may have the effects and benefits just described. In addition, by forcing the exhaust fluid to flow through the tortuous path between the second deflector 520 and the first deflector 510 the speed of the exhaust fluid flow may be controlled. For example, the flow speed may be increased in the vicinity of the deflectors by controlling the effective open area for exhaust gas flow. Where the flowhood 5 contains one or more sensors that require a minimum flow rate to produce a stable and reliable signal output, the increased flow speed that may be created by using the one or more deflectors 510, 520 may help the one or more sensors to function more accurately. For example, as described above the flowhoods 5 of the present disclosure may also be utilised in an emissions cleaning module 1 having a diesel particulate filter (DPF) incorporating a NOx sensor 550. By locating the tip of the NOx sensor 550 in the gap between the apex 513 of the first deflector 510 and the opposite side wall 502 the sensor may be exposed to higher flow rates of exhaust gas. In addition the presence of the second deflector 520 may further enhance the flow velocity and stability.

The combined use of the mixing element 33 (of either version described above) and the flowhood 5 containing one or more deflectors 510, 520 as described above may allow for uniform mixing of the injected fluid with the exhaust gas, especially due to the swirling, cyclonic motion of the exhaust gas set up by the action of the one or more deflectors 510, 520 and further, optionally, enhanced by the use of different arrangements of apertures 307 in the first and second zones 307a, 307b of the mixing element 33. Thus, a further baffle downstream of the mixing element 33 for increasing the uniformity of the flow before the mixture of the exhaust gas and the injected fluid reaches the second conduit 4 may not be required.

The invention claimed is:

1. A flowhood for an emissions cleaning module having an upstream conduit and a downstream conduit, the flowhood comprising:
   a first section;
   a second section coupled to the first section, the first section and the second section defining an internal volume of the flowhood,
   the second section defining a first aperture and a second aperture therethrough, the first aperture being configured for fluid connection to the upstream conduit, the second aperture being configured for fluid connection to the downstream conduit;
   an elongate body conduit disposed at least partly within the internal volume of the flowhood and projecting through the second aperture, the elongate body conduit being configured to effect fluid communication between the internal volume of the flowhood and the downstream conduit; and
   at least one deflector disposed within the internal volume of the flowhood and located at least partly between the first aperture and the second aperture along a first direction that extends from the first aperture toward the second aperture, the at least one deflector extending at least partly between the first aperture and the second aperture along a second direction that is transverse to the first direction,
   the at least one deflector being concentrically arranged with the elongate body conduit and being spaced apart from the elongate body conduit, such that the at least one deflector and the elongate body conduit define a circulation flow path therebetween, the circulation flow path being configured to effect a circulation fluid flow about a perimeter the elongate body conduit.

2. The flowhood as claimed in claim 1, wherein the first aperture and the second aperture each face the second direction.

3. The flowhood as claimed in claim 1, wherein the first section of the flowhood comprises a rear wall and a sidewall defining an open mouth of the first section, and
   the second section comprises a body that closes the open mouth of the first section other than at the first aperture and the second aperture.

4. The flowhood as claimed in claim 3, wherein the flowhood is tapered by shaping and/or angling of the sidewall.

5. The flowhood as claimed in claim 1, wherein the second aperture is located at a downstream end of the flowhood and the first aperture is located at an upstream end of the flowhood.

6. The flowhood as claimed in claim 5, wherein the flowhood is tapered along the first direction such that a dimension of the upstream end is larger than a dimension of the downstream end.

7. The flowhood as claimed in claim 1, wherein the at least one deflector comprises at least one curved element having a concave surface, the concave surface facing the elongate body conduit and at least partly defining the circulation flow path.

8. The flowhood as claimed in claim 1, wherein the at least one deflector comprises a generally V-shaped configuration having a first element and a second element joined at an apex, the apex being disposed between the first aperture and the second aperture along the first direction.

9. The flowhood as claimed in claim 1, wherein a rear wall of the first section defines a third aperture that is configured for mounting of an injector module.

10. The flowhood as claimed in claim 9, wherein the third aperture faces the second direction, and the third aperture at least partially overlaps with the second aperture along the first direction.

11. The flowhood as claimed in claim 1, wherein the first section of the flowhood includes a first sidewall and a second sidewall, the first sidewall facing the second sidewall along the second direction, the at least one deflector includes a first deflector and a second deflector, the first deflector extends away from the first sidewall at least partly along the second direction, the second deflector extends away from the second sidewall at least partly along the second direction, the first deflector overlaps with the second deflector along the second direction, and the second deflector is disposed between the first deflector and the first aperture along the first direction.

12. An emissions cleaning module comprising an upstream conduit, a downstream conduit and a flowhood, the flowhood comprising:

a first section;

a second section coupled to the first section, the first section and the second section defining an internal volume of the flowhood, the second section defining a first aperture and a second aperture therethrough, the first aperture being fluidly connected to the upstream conduit, the second aperture being fluidly connected to the downstream conduit;

an elongate body conduit disposed at least partly within the internal volume of the flowhood and projecting through the second aperture, the elongate body conduit effecting fluid communication between the internal volume of the flowhood and the downstream conduit; and at least one deflector disposed within the internal volume of the flowhood and located at least partly between the first aperture and the second aperture along a first direction that extends from the first aperture toward the second aperture, the at least one deflector extending at least partly between the first aperture and the second aperture along a second direction that is transverse to the first direction, the at least one deflector being concentrically arranged with the elongate body conduit and being spaced apart from the elongate body conduit, such that the at least one deflector and the elongate body conduit define a circulation flow path therebetween, the circulation flow path being configured to effect a circulation fluid flow about a perimeter the elongate body conduit.

13. The emissions cleaning module as claimed in claim 12, further comprising a mixer that includes the elongate body conduit.

14. The emissions cleaning module as claimed in claim 13, wherein the mixer spans a junction between the flowhood and the downstream conduit.

15. The emissions cleaning module as claimed in claim 13, wherein an upstream end of the mixer is mounted to the flowhood and disposed within the internal volume of the flowhood, and a wall of the elongate body conduit defines a plurality of apertures therethrough, an internal volume of the elongate body conduit being in fluid communication with the internal volume of the flowhood via the plurality of apertures through the wall of the elongate body conduit.

16. The emissions cleaning module as claimed in claim 12, wherein the flowhood is formed from at least one component that is separate from the upstream conduit and the downstream conduit which are connected between the upstream conduit and the downstream conduit.

17. The emissions cleaning module as claimed claim 12, wherein the at least one deflector includes a first deflector and a second deflector.

18. The emissions cleaning module as claimed in claim 17, wherein the first section of the flowhood includes a first sidewall and a second sidewall, the first sidewall facing the second sidewall along the second direction, the first deflector extends away from the first sidewall at least partly along the second direction, the second deflector extends away from the second sidewall at least partly along the second direction, the first deflector overlaps with the second deflector along the second direction, and the second deflector is disposed between the first deflector and the first aperture along the first direction.

19. The emissions cleaning module as claimed in claim 12, wherein the at least one deflector comprises at least one curved element having a concave surface, the concave surface facing the elongate body conduit and at least partly defining the circulation flow path.

* * * * *